(12) United States Patent
Yiu et al.

(10) Patent No.: US 10,511,569 B2
(45) Date of Patent: Dec. 17, 2019

(54) TECHNIQUES FOR PROVIDING MULTI-MODAL MULTI-PARTY CALLING

(71) Applicant: Facebook, Inc., Menlo Park, CA (US)

(72) Inventors: Tomi Yiu, Seattle, WA (US); Cameron James Pickett, Seattle, WA (US); Naizhi Li, Redmond, WA (US); Chi Wang Ho, Redmond, WA (US); Parama Jyothi Reddappagari, Redmond, WA (US)

(73) Assignee: FACEBOOK, INC., Menlo Park, CA (US)

( * ) Notice: Subject to any disclaimer, the term of this patent is extended or adjusted under 35 U.S.C. 154(b) by 268 days.

(21) Appl. No.: 15/237,448

(22) Filed: Aug. 15, 2016

(65) Prior Publication Data

US 2018/0048621 A1  Feb. 15, 2018

(51) Int. Cl.
*H04L 29/12* (2006.01)
*H04L 29/06* (2006.01)
*H04L 12/58* (2006.01)
*H04L 29/08* (2006.01)
*H04L 12/18* (2006.01)

(52) U.S. Cl.
CPC ...... *H04L 61/2589* (2013.01); *H04L 12/1818* (2013.01); *H04L 51/04* (2013.01); *H04L 61/106* (2013.01); *H04L 61/2514* (2013.01); *H04L 65/1069* (2013.01); *H04L 65/403* (2013.01); *H04L 67/104* (2013.01)

(58) Field of Classification Search
CPC ... H04L 61/2589; H04L 51/04; H04L 65/403; H04L 65/4084
See application file for complete search history.

(56) References Cited

U.S. PATENT DOCUMENTS

| | | | |
|---|---|---|---|
| 2007/0157303 A1* | 7/2007 | Pankratov | H04L 29/12528 726/11 |
| 2009/0055473 A1* | 2/2009 | Synnergren | H04L 29/06027 709/204 |
| 2011/0249079 A1* | 10/2011 | Santamaria | H04M 7/0057 348/14.02 |
| 2012/0047270 A1* | 2/2012 | Chandrasekaran | H04L 41/12 709/227 |
| 2012/0140908 A1* | 6/2012 | Sana | H04M 7/0057 379/93.01 |
| 2014/0241215 A1* | 8/2014 | Massover | H04L 12/1818 370/260 |
| 2016/0094589 A1* | 3/2016 | Gunnalan | H04L 65/1069 709/227 |
| 2016/0191461 A1* | 6/2016 | Wang | H04L 65/103 709/227 |
| 2016/0294913 A1* | 10/2016 | Jansson | H04L 67/02 |

* cited by examiner

*Primary Examiner* — Nicholas R Taylor
*Assistant Examiner* — Sanjoy Roy

(57) ABSTRACT

Techniques for providing multi-modal multi-party calling include receiving a join request at a multiway server (MWS) from a first client, the join request identifying a second client; sending a call invitation to the second client from the MWS; receiving a connection from the second client to the MWS; receiving a first media status from one of the first client or the second client while the first client and the second client are in a peer-to-peer mode; and forwarding the first media status to the other of the first client or the second client. Other embodiments are described and claimed.

14 Claims, 19 Drawing Sheets

TECHNIQUES FOR PROVIDING MULTI-MODAL MULTI-PARTY CALLING

BACKGROUND

Interpersonal communication has progressed from the written word and voice communication to instantaneous communications that may include text, images, video, and sound. Interpersonal communication can take place between two or among many participants. Further, the participants may each be using different types of devices, and may switch from one communication mode, e.g. voice-only, to other modes, such as video calling. Coordinating the communications as the call situation changes may be challenging. It is with respect to these and other considerations that the present improvements are needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments provide multi-modal, multi-way calling. Some embodiments are particularly directed to techniques for managing changing media status among devices in a call, and for seamlessly adding additional participants to the call.

In one embodiment, for example, a method may include receiving a join request at a multiway server (MWS) from a first client, the join request identifying a second client; sending a call invitation to the second client from the MWS; receiving a connection from the second client to the MWS; receiving a first media status from one of the first client or the second client while the first client and the second client are in a peer-to-peer mode; and forwarding the first media status to the other of the first client or the second client. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
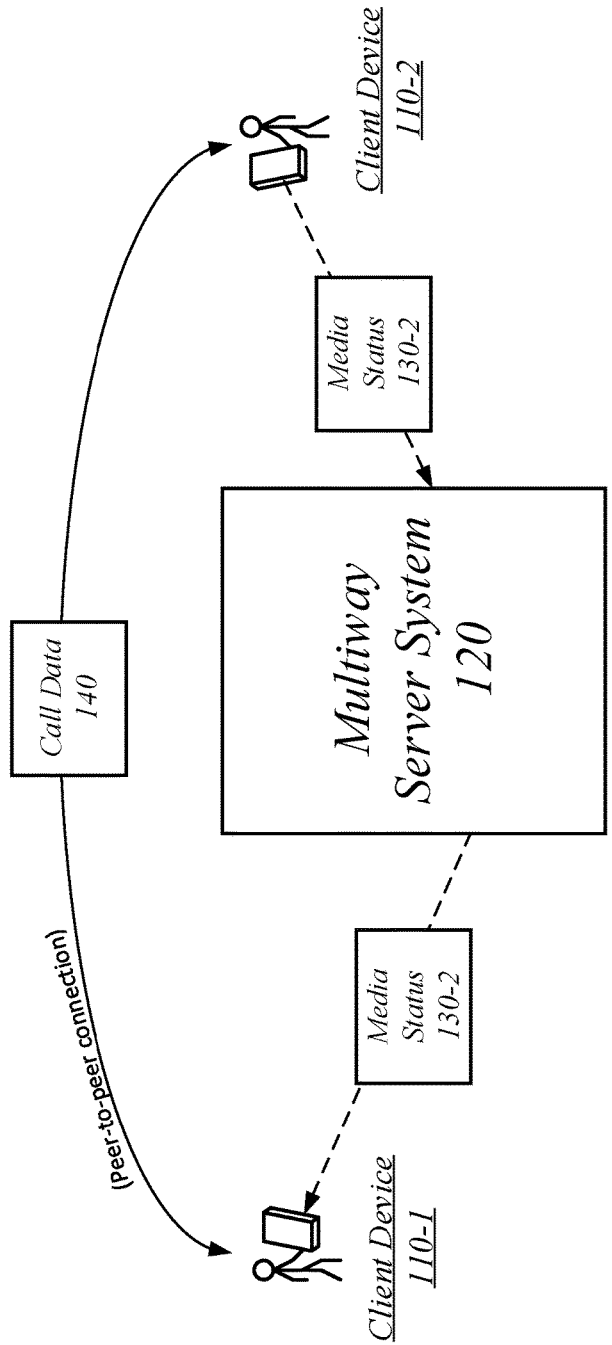
FIG. 1 illustrates an embodiment of an execution system for a multiway communication system.

Various embodiments are generally directed to techniques for providing multi-modal multi-way calling. Some embodiments are particularly directed to techniques for managing changing media status among devices in a call, and for seamlessly adding additional participants to the call.

Conventional management of multi-modal calls may be understood in the context of peer-to-peer or two-party calls. When one of the two devices in the call changes its media status, for example, by enabling a video mode and/or a data mode, the change in media status may be communicated directly to the other of the two devices so that the other device can make a similar change. Without such an update, one device may not present the video data received from the device that is now in "video mode." However, in calls involving three or more devices, such media status updates can rapidly become unwieldy as each device must be updated and send updates to the other devices.

Embodiments described herein include a multiway server (MWS) that provides support for multi-modal calls in both a peer-to-peer (P2P) call and in multi-party calls, e.g. more than two parties, and allow for seamlessly adding additional participants to a call. As used herein, "multi-modal communication" may refer to calls where more than one mode of communication is possible. Modes of communication may include, for example, and without limitation, voice mode, video mode, data mode, or text mode. Many computing devices now support more than one mode of communication and may be able to enable or disable the various modes during a call.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to an apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct a more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a multiway communication system 100 for providing multi-modal, two-party, and/or multi-party communication. In one embodiment, the system 100 may comprise a computer-implemented system 100 having a client device 110-1 operated by a first participant, a client device 110-2 operated by a second participant, and a multiway server system 120, each comprising one or more components. Although the system 100 shown in FIG. 1 has a limited number of elements in a certain topology, it may be appreciated that the system 100 may include more or fewer elements in alternate topologies as desired for a given implementation.

As shown in FIG. 1, the participants may be communicating over a P2P connection with the exchange of call data 140. Call data 140 may include any data comprising communication from one participant to the other participant(s). Call data 140 may include, for example, audio data, video data, text-only data, digital files, images, emojis, stickers, audio stickers, or any other data representing communication from a participant. Call data 140 may be in any data format capable of being transmitted over a network in use by the call.

In addition, the system 100 may include a multiway server system 120. The multiway server system 120 may assist in setting up a call between two or more participants such as client device 110-1 and 110-2, and may coordinate the exchange of media status information among the participants, such as media status 130-2. As will be explained further below, the multiway server system 120 may receive the media status 130-2 from the client device 110-2 when, for example, the client device 110-2 enables a video mode to begin sending video data. The multiway server system 120 may receive the media status 110-2 and forward it to the client device 110-1. This may occur when the participants are in a P2P mode and the call data 140 is not sent through the multiway server system 120. The multiway server system 120 may be embodied in a single device or with multiple devices.

A client device 110 may be any electronic device capable of, at least, receiving audio data and/or recording audio data from a microphone, outputting audio data to the sender, and communicating with other devices to exchange data and instructions over a network. The client device 110 may communicate with other devices using wireless transmissions to exchange network traffic. Exchanging network traffic, such as may be included in the exchange of call data 140 and/or media status 130-2, may comprise transmitting and receiving network traffic via a network interface controller (NIC). A NIC comprises a hardware component connecting a computer device, such as client device 110, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API).

The client device 110 may perform various operations using network data accessed over a network. The client device 110 may access a cellular system using cellular signals (not shown). The client device 110 may access one or more Wi-Fi access points using Wi-Fi signals (not shown).

Figure 2:
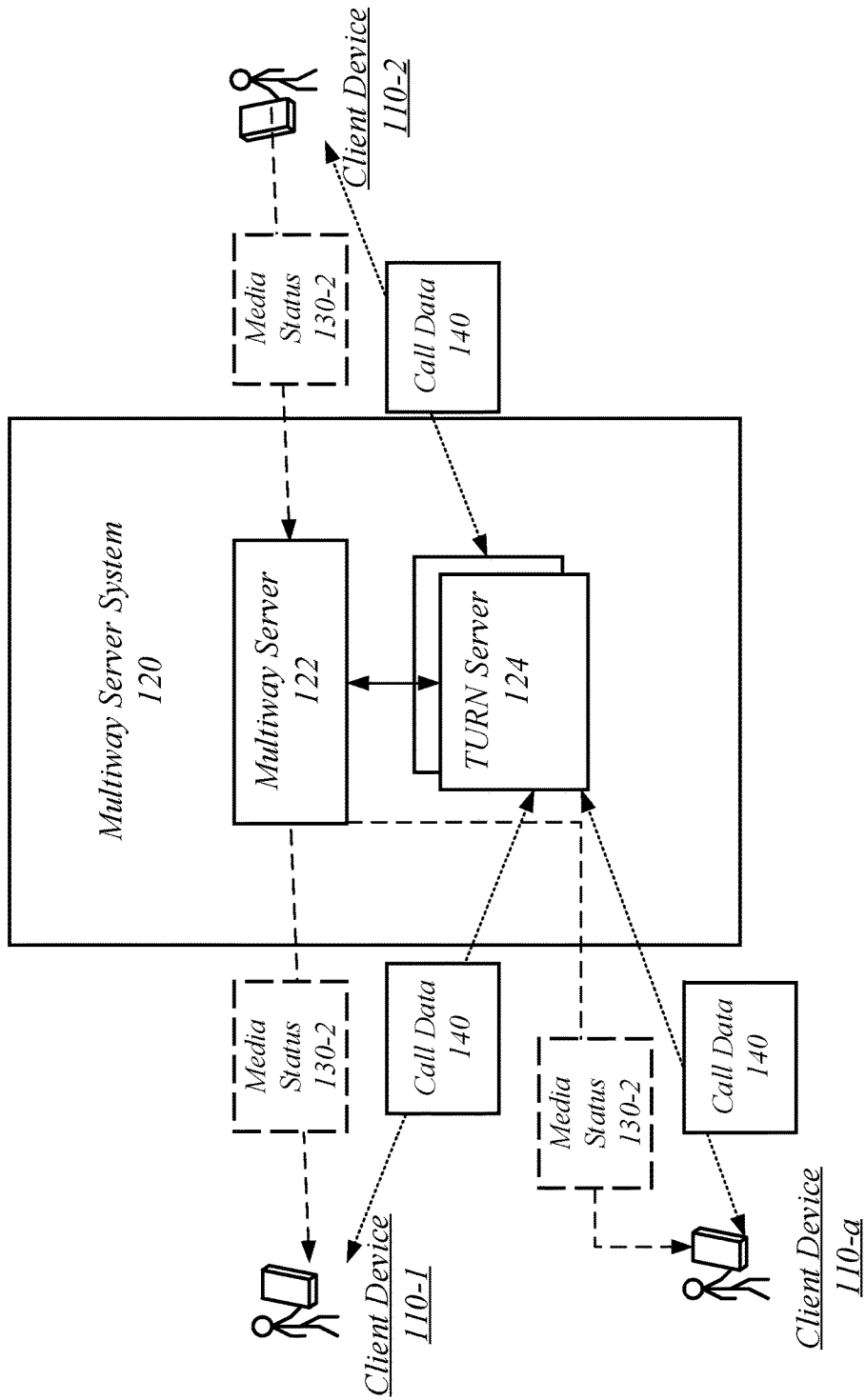
FIG. 2 illustrates an embodiment of a for the system of FIG. 1.

FIG. 2 illustrates a block diagram for the multiway communication system 100. Although the system 100 shown in FIG. 2 has a limited number of elements in a certain topology, it may be appreciated that the system 100 may include more or fewer elements in alternate topologies as desired for a given implementation.

As shown in FIG. 2, the participants, using client devices 110-2, 110-2, and 110-α, may be communicating with the exchange of call data 140 via the multiway server system 120, and are not in a peer-to-per mode.

The multiway server system 120 may comprise one or more multiway servers (MWS) 122, and one or more "traversal using relays around network address translators" (TURN) servers 124. The MWS 122 may not have a public Internet protocol (IP) address, while a TURN server 124 does have a public IP address. When a client, e.g. client device 110-1, initiates a call via the MWS 122, the MWS 122 may allocate a port on a TURN server 124 so that the client may connect and exchange call data 140 via the TURN server 124.

The TURN server 124 may receive the call data 140 from the client devices 110 and may forward the call data 140 to the MWS 122 for sending to the other participants in the call.

While the one or more TURN servers 124 act as relay servers for the exchange of call data 140, the MWS 122 may receive media status updates, e.g. media status 130-2, from any of the participants in the call, and may push the media status to the other participants in the call.

Figure 3:
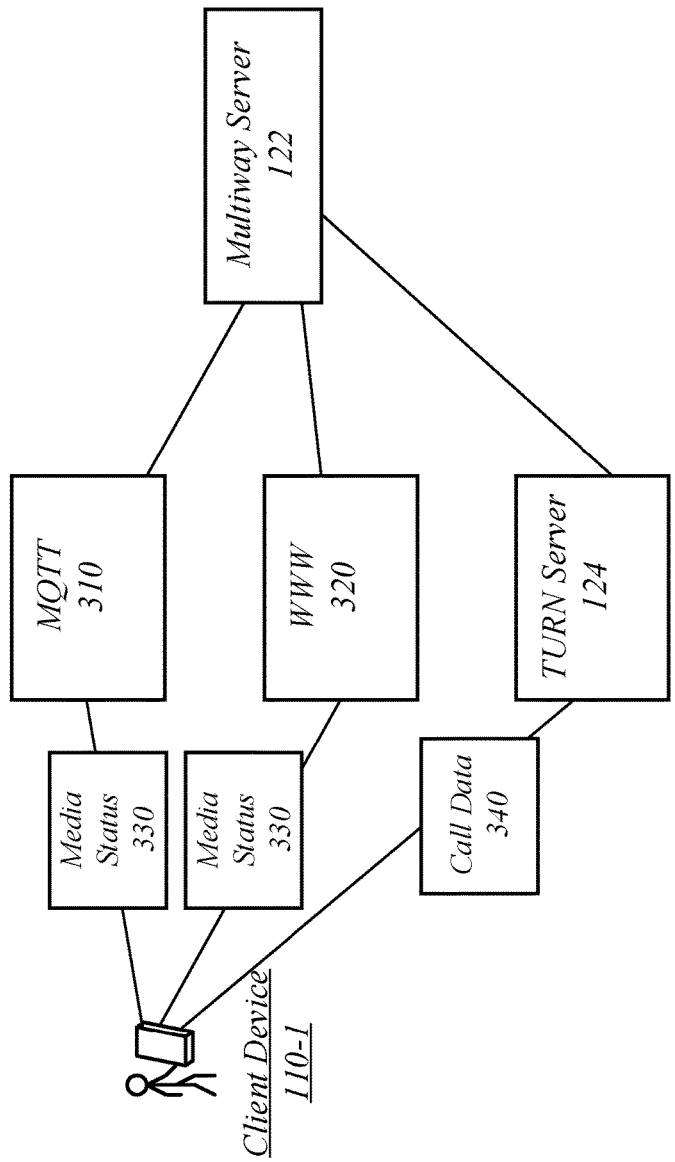
FIG. 3 illustrates an embodiment of a message application component for the system of FIG. 1.

FIG. 3 illustrates a block diagram of the multiway communication system 100. In particular, FIG. 3 illustrates possible communication paths between a client, e.g. client device 110-1 and the multiway server 122.

In an embodiment, when the client device 110-1 is using a web browser application to conduct the call, communications may reach the MWS 122 via the world wide web (WWW) 320 and its protocols. When the client device 110-1 is a mobile device using a client application, communications may reach the MWS 122 via message queueing telemetry transport (MQTT) 310.

While the call is in progress, any media status 330 messages may be communicated to or from the MWS 122 via either MQTT 310 or WWW 320. Call data 340 may be communicated to or from the MWS 122 via the TURN server 124.

Figure 4:
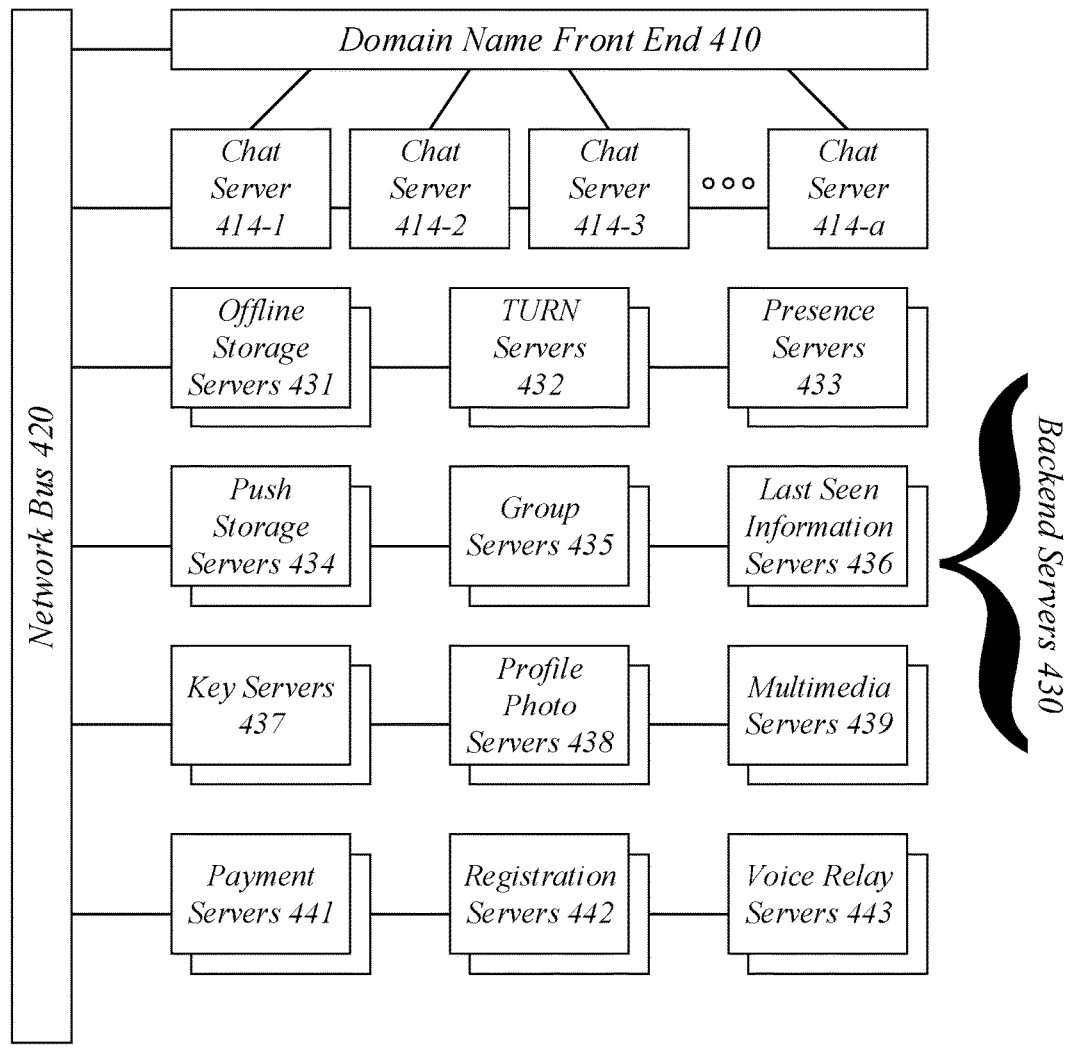
FIG. 4 illustrates an embodiment of a messaging system for the system of FIG. 1.

FIG. 4 illustrates an embodiment of a plurality of servers implementing various functions of a messaging system 400. It will be appreciated that different distributions of work and functions may be used in various embodiments of a messaging system 400. The messaging system 400 may implement some or all of the multiway server system 120.

The messaging system 400 may comprise a domain name front end 410. The domain name front end 410 may be assigned one or more domain names associated with the messaging system 400 in a domain name system (DNS). The domain name front end 410 may receive incoming connections and distribute the connections to servers providing various messaging services.

The messaging system 400 may comprise one or more chat servers 414. The chat servers 414 may comprise front-end servers for receiving and transmitting user-to-user messaging updates such as chat messages or call data 140. Incoming connections may be assigned to the chat servers 414 by the domain name front end 410 based on workload balancing or on the location of a client device 110 initiating a call. The one or more chat servers 414 may be embodiments of one or more multiway servers 122, and may not be publicly accessible.

The messaging system 400 may comprise backend servers 430. The backend servers 430 may perform specialized tasks in the support of the chat operations of the front-end chat servers 414. A plurality of different types of backend servers 430 may be used. It will be appreciated that the assignment of types of tasks to different backend serves 430 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 400 may comprise one or more offline storage servers 431. The one or more offline storage servers 431 may store messaging content for currently-offline messaging endpoints in hold for when the messaging endpoints reconnect.

The messaging system 400 may comprise one or more TURN servers 432. The one or more TURN servers 432 may each have one or more publicly accessible network ports to which client devices 110 may connect to conduct multimodal calls.

The messaging system 400 may comprise one or more presence servers 433. The one or more presence servers 433 may maintain presence information for the messaging system 400. Presence information may correspond to user-specific information indicating whether or not a given user has an online messaging endpoint and is available for chatting, has an online messaging endpoint but is currently away from it, does not have an online messaging endpoint, and any other presence state.

The messaging system 400 may comprise one or more push storage servers 434. The one or more push storage servers 434 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 400 may comprise one or more group servers 435. The one or more group servers 435 may maintain lists of groups, add users to groups, remove users from groups, and perform the reception, caching, and forwarding of group chat messages.

The messaging system 400 may comprise one or more last seen information servers 436. The one or more last seen information servers 436 may receive, store, and maintain information indicating the last seen location, status, messaging endpoint, and other elements of a user's last seen connection to the messaging system 400.

The messaging system 400 may comprise one or more key servers 437. The one or more key servers 437 may host public keys for public/private key encrypted communication.

The messaging system 400 may comprise one or more profile photo servers 438. The one or more profile photo servers 438 may store and make available for retrieval profile photos for the plurality of users of the messaging system 400.

The messaging system 400 may comprise one or more multimedia servers 439. The one or more multimedia servers 439 may store multimedia (e.g., images, video, audio) in transit between messaging endpoints, and multimedia cached for offline endpoints, and may perform transcoding of multimedia.

The messaging system 400 may comprise one or more payment servers 441. The one or more payment servers 441 may process payments from users. Payments may be received, for example, when a connection to a cellular data network is purchased. The one or more payment servers 441 may connect to external third-party servers for the performance of payments.

The messaging system 400 may comprise one or more registration servers 442. The one or more registration servers 442 may register new users of the messaging system 400.

The messaging system 400 may comprise one or more voice relay servers 443. The one or more voice relay servers 443 may relay voice-over-internet-protocol (VoIP) voice communication in call data 140 between messaging endpoints for the performance of VoIP calls.

The components of messaging system 400 may communicate via a network bus 420. The messaging system 400 may include an authorization server (or other suitable component(s)) that allows users to opt in to or opt out of having their actions logged by the multiway communication system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the multiway communication system 100 and other elements of a social-networking system through blocking, data hashing, anonymization, or other suitable techniques as appropriate.

Figure 5:
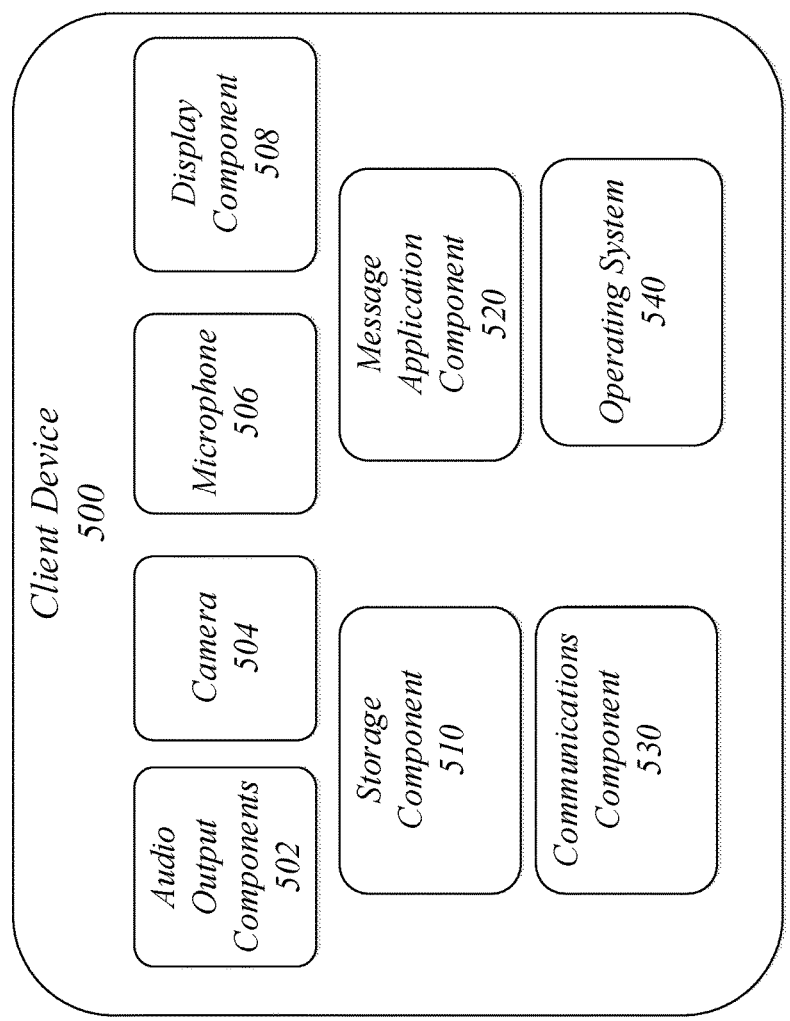
FIG. 5 illustrates an embodiment of a client device for the system of FIG. 1.

FIG. 5 illustrates a block diagram of a client device 500 for the system 100. The client device 500 may be an embodiment of client device 110. The client device 500 may include various hardware components and software components. The hardware components may include various audio output components 502, a camera 504, a microphone 506, and a display component 508. Other hardware components may also be included, such as various other input components, e.g. a keyboard or keypad, as well as a global positioning system (GPS) component, an altimeter, and so forth.

The audio output components 502 may include any components operative to output sound waves, such as an earpiece speaker, a loudspeaker, and/or an audio-out connection. The audio output components 502 may include hardware and/or software that converts between analog and digital sound data.

The camera 504 may be a camera integrated into the client device 500 that can take digital photographs through a lens and store the digital photos. The camera 504 may also operate as a video camera that can record video data for storage and/or transmission during a video call.

The microphone 506 may be any device capable of receiving sound waves, e.g. spoken by a human operator, and converting the received sound waves into electrical signals and/or data that can be stored and transmitted to other devices. The microphone 506 may be integrated into the client device 500, or may be an external microphone coupled to the client device 500 wirelessly or through an external wired connection. The microphone 506 may be for example, a component of a head-set, earpiece, or other hands-free communication device that communicates with the client device 500 via a short-range signal technology such as BLUETOOTH® technology. The embodiments are not limited to this example.

The display component 508 may include any interface components capable of presenting visual information to the operator of the client device 500, such as, but not limited to, a screen for visual output including video data received during a call that includes video data or other visual forms of communication.

The client device 500 may further include a storage component 510 in the form of one or more computer-readable storage media capable of storing data and instructions for the functions of software, such as a message application component 520, and an operating system 540. As used herein, "computer-readable storage medium" is not intended to include carrier waves, or propagating electromagnetic or optical signals.

The client device 500 may include various software components, such as a message application component 520. The message application component 520 may comprise instructions that when executed by a processing circuit (not shown) cause the client device 500 to perform the operations of the message application component 520 as will be described herein. Generally, the message application component 520 may be provided on the client device 500 at the time of purchase, or may installed by the sender, and may enable the creation, communication, and playback of communication in a variety of formats, including, but not limited to, real-time audio, audio messages, text, real-time video, and video recordings.

The message application component 520 may be software and/or a combination of software and hardware operating on any electronic device capable of sending and receiving call data 140 and media status 130 to and from the client device 110.

The message application component 520 may allow a participant to communicate with others, e.g. with other participants, by sending and receiving call data 140, in a manner analogous to a telephone call. The message application component 520 may be, for example, and without limitation, an electronic mail application, a short-message-service (SMS) message application, a multimedia-message-service (MMS) message application, a group communication application, a telephone voicemail system application, a video-communication application, and so forth. The message application component 520 may be a message application that provides multiple modes of communication, including but not limited to, alphanumeric text, real-time voice calls, real-time video calls, multimedia messages, data representing special effects, and so forth. The message application component 520 may be a social network application that allows its members to communicate with messages. The message application component 520 may accept an address for a recipient, such as an e-mail address, a chat handle, a telephone number, a user name within a social network service, and so forth.

The message application component 520 may operative to send a join request to the multiway server (MWS) to start a call with a second client. The join request may be sent via message queueing telemetry transport (MQTT) or the world wide web (WWW).

The message application component 520 may be operative to receive a connection status of the second client from the MWS 122, e.g. "ringing", "connecting", "connected" and/or "declined". In some embodiments the message application component 520 may present the connection status to the user via the display component 508.

The message application component 520 may be operative to negotiate a peer to peer connection with the second client. For example, once the second client has answered the call and is connected, the message application component 520 and the communications component 530 may send a P2P setup message to the MWS 122 and/or to the second client directly. The P2P setup message may request a P2P connection and may provide one or more parameters of the client device and/or other information that may be needed to make a P2P connection.

The message application component 520 may be operative to exchange call data with the other client participating in the call in a peer to peer mode. For example, the message application component 520 may receive, from the operator, communication input in any of a variety of forms, such as text, video, audio, special effect selections and so forth. The message application component 520 may format the communication input for transmission over the P2P connection, e.g. into packets of call data. The call data may be transmitted by the communication component 530 directly to the other client device over the P2P connection.

The message application component 520 may be operative to exchange media status changes with the MWS. For example, if the operator of the client device 500 turns on the camera or otherwise enables a video mode of communication, the message application component 520 may send a media status to the MWS 122 that indicates that video mode is now on.

The message application component 520 may be operative to send a request to a multiway server (MWS) to add a third client to a call in progress. The call in progress may be in a P2P mode or in a relay mode.

The message application component 520 may be operative to receive a TURN server port address from the MSW 122. The message application component 520 may be operative to drop a P2P call, if in progress, and/or connect to the TURN server when the port address is received.

Accordingly, the message application component 520 may operate to allow the user of the client device 500 to initiate a multi-modal call with one or more other participants, and to join in such a call when the call is initiated by another participant.

The client device 500 may include a communications component 530. The communications component 530 may include one or more hardware and/or software components that allow the transmission and receiving of signals by the client device 500. The communications component 530 may include the hardware and/or instructions to communicate on a data network, such as over a long-term evolution (LTE) network. The communications component 530 may include the hardware and/or instructions to communicate in a shorter-range network, such as by Wi-Fi or by BLUETOOTH®. The communications component 530 may include the hardware and/or instructions to communicate on a cellular telephone network, such as cellular system 130. The communications component 530 may support peer-to-peer network connections, and may be able to detect when other client devices are available for a peer-to-peer connection.

Figure 6:
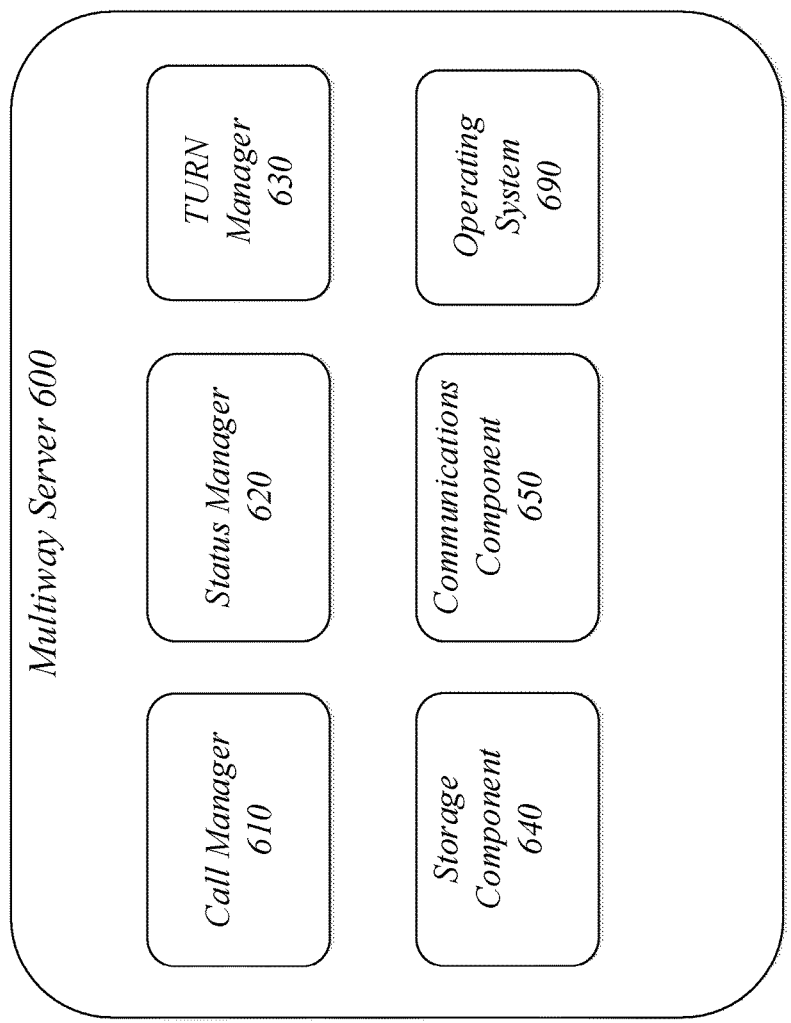
FIG. 6 illustrates an embodiment of a multiway server for the system of FIG. 1.

FIG. 6 illustrates an embodiment of a multiway server 600 for the multiway communication system 100. The MWS 600 may be an embodiment of the MWS 122. The MWS 600 may include various functional components, such as a call manager 610, a status manager 620 and a TURN manager 630. The functional components may represent physical or logical instructions that, when executed by a processor circuit (not shown), perform various operations as will be described. More, fewer, or other components may be used without departing from the functionality of the embodiments.

The call manager 610 may receive a join request from a client, for example, when the operator of the client wishes to initiate a call to another party. The join request may initiate a call and may identify a second client operated by the other party. The call manager 610 may send a call invitation to the second client and receive a connection from the second client. In an embodiment, the call manager 610 communicates with one or more client devices in a request-response manner in order to improve reliability of the communications. For example, the join request from the client may have a counterpart join response from the MWS 600 to the client.

While a connection to the second client is established, the MWS 600 may provide connection status messages to the first client, such as "ringing", "connecting," and/or "connected." Connection status messages are different from media status 130, which reflect what communication modes are enabled on a given device.

The TURN manager 630 may allocate a port on a TURN server for use by at least one of the clients participating in the call. The TURN manager 630 may provide an address of the allocated port to the first client and the second client. In some embodiments, each participating client may receive an address to a port on a different TURN server. The TURN manager 630 may automatically allocate a port when a call is initiated. In some embodiments, the TURN manager 630 may only allocate a port when there are at least three participating clients on a call, or when a peer to peer call is being converted into a relayed call.

When a call between at least two parties is already in progress, the call manager 610 may receive an add participant request from either the first client or the second client. The add participant request may identify a third client to add to the call. The call manager 610 may send a call invitation to the third client. The call manager 610 may provide the address of the port on the TURN server in the call invitation. The call manager 610 may receive a connection from the third client. If the two participants to the call are in a peer to peer mode when the add participant request is received, the call manager 610 may prompt the TURN manager 630 to allocate or provide the port address(es) on the TURN server(s) for use by the call participants, and may provide the port address(es) to the other participant client devices so that they may transition from P2P to a relay call using the TURN servers.

While a peer to peer (P2P) call is taking place, the MWS server 600 may not receive any call data 140. However, the call manager 610 may still receive P2P ping messages from the participating clients. A P2P ping message may be used to check and acknowledge that the two clients are still able to send and receive data to and from the other. The call manager 610 may forward the P2P ping messages to the other of the first client or the second client. The call manager 610 may notify the first client and the second client when a P2P ping message is not received, and may provide a port address on a TURN server to each client device to enable transitioning the call to a relay mode. Thus, if the P2P connection degrades or fails in some way, the call manager 610 informs the clients and assists in converting the call from a P2P mode to a relay mode.

In an embodiment, the call manager 610 may allow an operator of a participating client device to switch to a different device without having to drop from the call and reconnect. For example, if the operator of the first client wishes to switch from their mobile device to a laptop device, the call manager 610 may receive a second join request from a third client—the laptop device. The call manager 610 may know or determine that the laptop device is associated with the operator of the mobile device first client. For example, the join request may include an identifier of the user, of the laptop, or both, and the call manager 610 may have access to data that maps a user identifier to device identifiers. The call manager 610 may accept the join request from the third client (the laptop), and disconnect the other client (the mobile device) associated with the same user.

In an embodiment, the call manager 610 may provide a video preview for an invited client before the client connects to the call. For example, the call manager 610 may receive video data from the first client with or after the join request. The call manager 610 may forward the video data to the second client with or following the call invitation, and before receiving a connection from the second client. The second client may be able to present the video data to its operator before the operator elects to answer the call.

The status manager 620 is operative to coordinate media statuses among the participants of a call, regardless of whether the call is in a P2P mode or a relay mode. The status manager 620 may receive a first media status from one of the participating clients. The status manager 620 may forward the first media status to the other participating clients. This allows each participating client to be responsible only for updating the status manager 620 when the client enables or disables a mode of communication. The other clients receive a pushed media status 130 from the status manager 620 that informs the receiving clients that a particular participating device has enabled or disabled a mode of communication. The receiving clients may then change their communication mode to reflect the updated media status. In some embodiments, the clients may pull media status information from the status manager 620.

In some embodiments, a group call may be associated with a group chat conversation or thread, where a "chat" refers to the exchange of communication analogous to a text messaging session, such as the exchange of discrete messages rather than streaming audio or video. For example, some of the participants in the chat may be participating in a call that does include streaming audio or video data. In such an embodiment, the group chat participants who are not in the call may be able to see that the other participants are in a call, and may be able to join the call from within the group chat without having to be invited by a call participant.

The MWS 600 may include a storage component 640, a communications component 650, and an operating system 690, which may be analogous to the storage component 510, communications component 530, and operating system 540 discussed in FIG. 5. The storage component 640 may additionally store the instructions for the functional components, and the operating system 690. The storage component 640 may further store data used by the functional components, such as, but not limited to, mappings of users to client devices, addressed of TURN servers 124, and so forth.

In some embodiments, when a particular MWS 122 fails or otherwise goes off-line during a call, the TURN server(s) 124 involved in the call may be updated to route the call data to a back-up or alternate MWS 122 without packet loss.

FIGS. 7-11 illustrate various message flows for the system 100. The message flows may represent messages communicated among the components of system 100. In the illustrated message flows, time flows from the top of the diagram toward the bottom; and a "message" may include data and/or instructions communicated from one component to another, as well as internal functions within a component.

Figure 7:
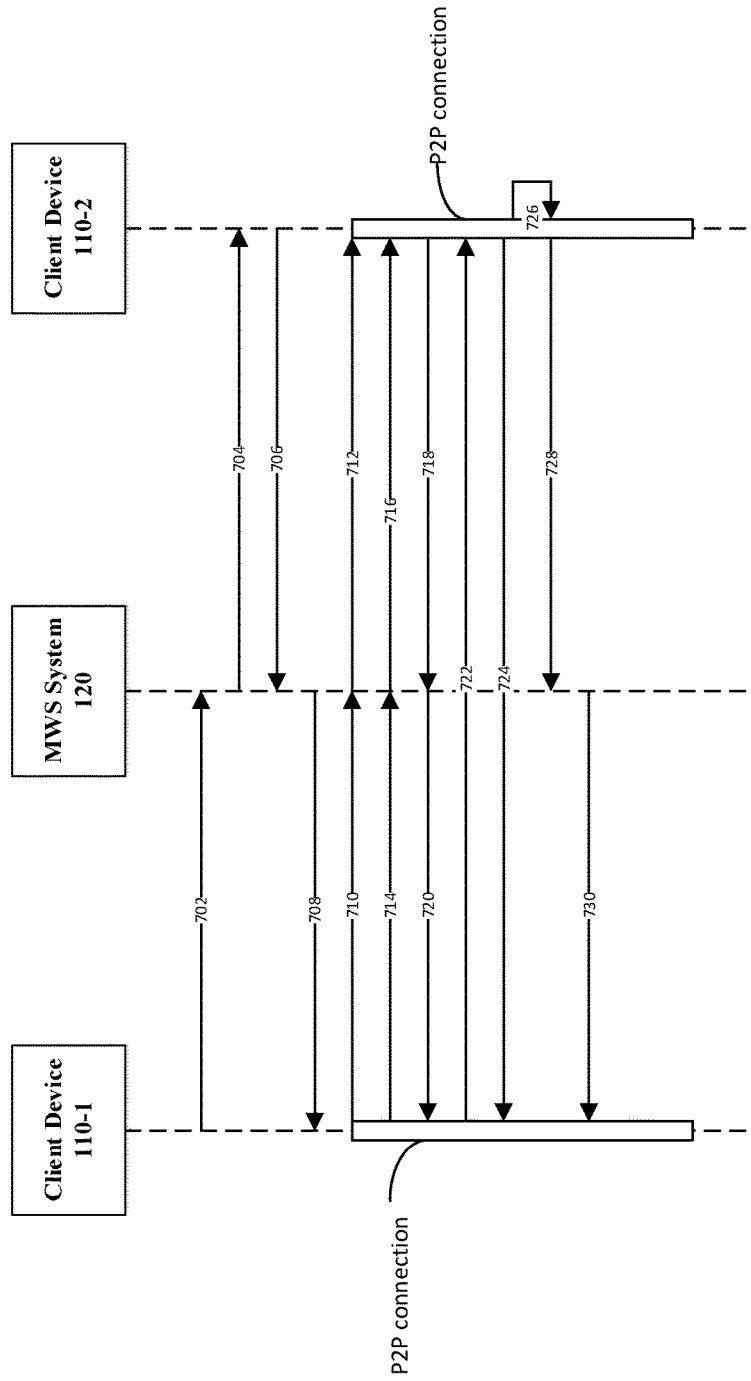
FIG. 7 illustrates an embodiment of a message flow for the system of FIG. 1.

FIG. 7 illustrates a message flow diagram 700 for the system 100. In particular, the message flow 700 may occur among two client devices, 110-1 and 110-2, and the MWS system 120. Message flow 700 may represent messages communicated when a peer to peer call is initiated by client device 110-1 to client device 110-2.

The message flow 700 begins when the client device 110-1 (the "first client") sends a join request to the MWS system 120 in message 702. The join request may include one or more parameters. For example, the join request may include an identifier of a second client device, e.g. of client device 110-2, that the operator of the first client device wishes to call. The identifier may be a phone number, a user name, an account name, or any other identifier that allows the MWS system 120 to contact the client device 110-2 to join the call. The join request may also include information such as, but not limited to, a group identifier to be used to identify the group of participants to the call, a thread identifier, a user identifier of the operator of the first client device, and/or a device identifier of the first client device. A thread identifier may identify a group chat thread that is associated with the call. If no group identifier exists, the MWS 122 may generate one. The join request may also include the codecs supported by the first client device and/or other call parameters.

In an embodiment where the MWS system 120 includes a plurality of multiway servers 122, the join request may be received by a MWS 122 that is geographically close to the client device 110-1. Any subsequent participants added to the same call may be connected to the same MWS 122 by way of the same group identifier.

The message flow 700 continues when the MWS system 120 sends a call invitation to the client device 110-2 (the "second client") in message 704. The call invitation may include various parameters, for example, a group identifier provided by the first client, an identifier of the first client device, or an identifier of the operator of the first client device.

The message flow 700 continues when the second client sends a ring response to the MWS system 120 in message 706. The ring response may include connection status information such as "ringing," "connecting," and/or "connected". In some embodiments, multiple ring responses may be sent as the second device changes connection status. The ring response may be an out of band message.

The message flow 700 continues when the MWS system 120 sends a connection status to the first client in message 708. The message 708 may include information from the ring response of message 706. In some embodiments, multiple connection status messages may be sent as the second device changes connection status.

The message flow 700 continues when the first client sends a request to set up a peer to peer (P2P) connection to the MWS system 120 in message 710. The message 710 may include parameters used to establish a P2P connection, such as, but not limited to, the connection protocols supported by the first client device.

The message flow 700 continues when the MWS system 120 sends the request to set up the P2P connection to the second client in message 712. The message 712 may be identical to the message 710. In some embodiments, the first client may send the message 710 directly to the second client in order to begin the P2P communication. Collectively, the messages 710 and 712 may include additional messages, such as responses to requests, or any messages needed to establish a P2P connection using known or later discovered techniques. At this time in the message flow 700, a P2P connection is established and active.

The message flow 700 continues, while the P2P connection is active, as the client devices exchange P2P ping messages. For example, the first client may send a P2P ping message to the MWS system 120 in message 714. The MWS system 120 may forward the P2P ping message to the second client in message 716. The second device may also send a P2P ping message to the first client, via the MWS system 120, in messages 718 and 720. In some embodiments, the MWS system 120 may record or log when a P2P ping message is received, in order to determine when a next P2P message may be expected. In some embodiments, the P2P ping messages may also be sent directly to the other client in addition to being sent to the MWS 122. In such an embodiment, the MWS 122 may not forward the P2P message to the other client.

The message flow 700 continues when the first client device sends call data to the second device in message 722. Because the client devices are in a P2P mode, the message 722 does not go through the MWS system 120. The call data may include communication in any form, e.g. audio, video, text, images, or other data, such as special effects applied to audio, video or image data. The call data in message 722 may be a digital representation of input from the operator of the first client device, e.g. speech, video and audio of the operator, entered text, and so forth. The second client device may respond with call data of its own, in message 724.

The messages 714, 716, 718, 722, and 724 may be repeated throughout the duration of the P2P call, and may occur in any order.

The message flow 700 continues when one of the client devices, e.g. the second client device, makes a change to a communication mode. For example, the second client device may enable or turn on a video mode in message 726. Enabling a video mode may cause a camera on the second client device to begin to receive video data, and may cause the second client device to perform any processing, e.g. compression, to the video data before sending the video data to the first client.

The message flow 700 continues when the second client device sends an updated media status to the MWS system 120 in message 728. The message 728 may, for example, include data that identifies what mode of communication changed, and whether the change was to enable or disable the mode of communication.

The message flow 700 continues when the MWS system 120 pushes the media status of the second client device to the first client device, in message 730. In some embodiments, the MWS system 120 may also store and/or update media status information in its storage component so that the media status may be provided, for example, to a participant who joins the call at a later time.

Some or all of the messages shown in the message flow 700 may have accompanying response messages, which are omitted for clarity and brevity.

Figure 8:
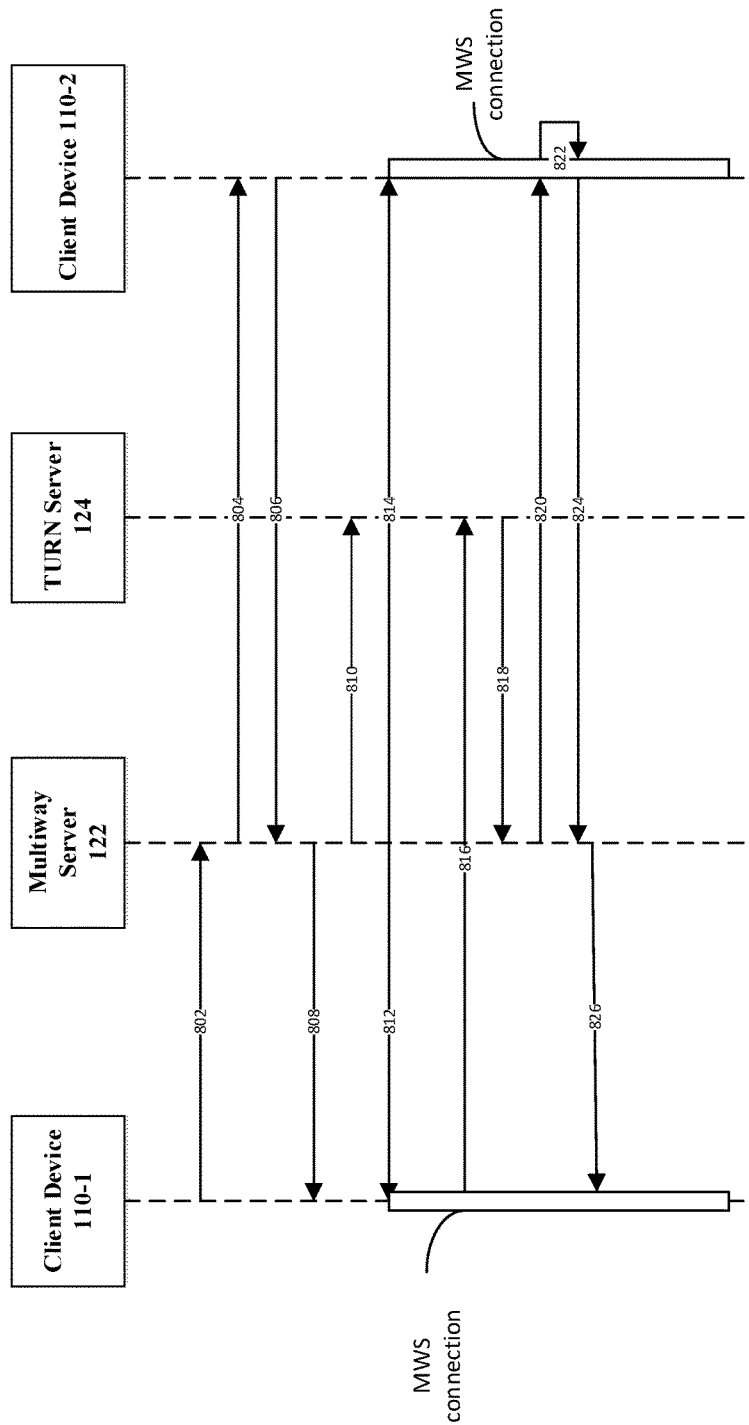
FIG. 8 illustrates an embodiment of a second message flow for the system of FIG. 1.

FIG. 8 illustrates an embodiment of a second message flow for the system of FIG. 1. In particular, the message flow 800 may occur among two client devices, 110-1 and 110-2, the multiway server 122 and a TURN server 124. Message flow 800 may represent messages communicated when a call is initiated by client device 110-1 to client device 110-2 in a relay mode.

The messages 802, 804, 806 and 808 may be equivalent to the messages 702, 704, 706, and 708 of the message flow 700.

The message flow 800 continues, once the second client device 110-2 has connected to the call, when the MWS 122 allocates a port on the TURN server 124, using message 810.

The message flow 800 continues when the MWS 122 provides the port address to the client devices 110-1 and 110-2 in messages 812 and 814, respectively. At this time in the message flow 800, the client devices 110-1 and 110-2 are connected in a relay mode for a MWS connection. The messages 812 and 814 may be join response messages that include the port IP address.

The message flow 800 continues when a client device, e.g. client device 110-1, sends call data to the port on the TURN server 124 in message 816. The message 816 may include communication in any form, e.g. audio, video, text, images, or other data, such as special effects applied to audio, video or image data, and may be analogous to the message 722.

The message flow 800 continues when the TURN server 124 forwards the call data to the MWS 122 in message 818.

The message flow 800 continues when the MWS 122 forwards the call data to the client device 110-2, in message 820. In some embodiments, the MWS 122 may receive the call data, decrypt the call data, decode the call data, and duplicate the call data to be sent out to the other participants in the call. In some embodiments, the call data may be stored temporarily, for example, in the event that one of the participant's has a poor connection, so that the call data may be re-sent.

The message flow 800 continues when one of the client devices, e.g. the client device 110-2, makes a change to a communication mode. For example, the client device 110-2 may enable or turn on a video mode in message 822.

The message flow 800 continues when the client device 110-2 sends an updated media status to the MWS 122 in message 824, and the media status is pushed to the client device 110-2 in message 826. The messages 824 and 826 may be analogous to the messages 728 and 730. Of note is that the media status is sent to the MWS 122 and not to the TURN server 124, which continues to relay call data between the two client devices and the MWS 122.

Figure 9:
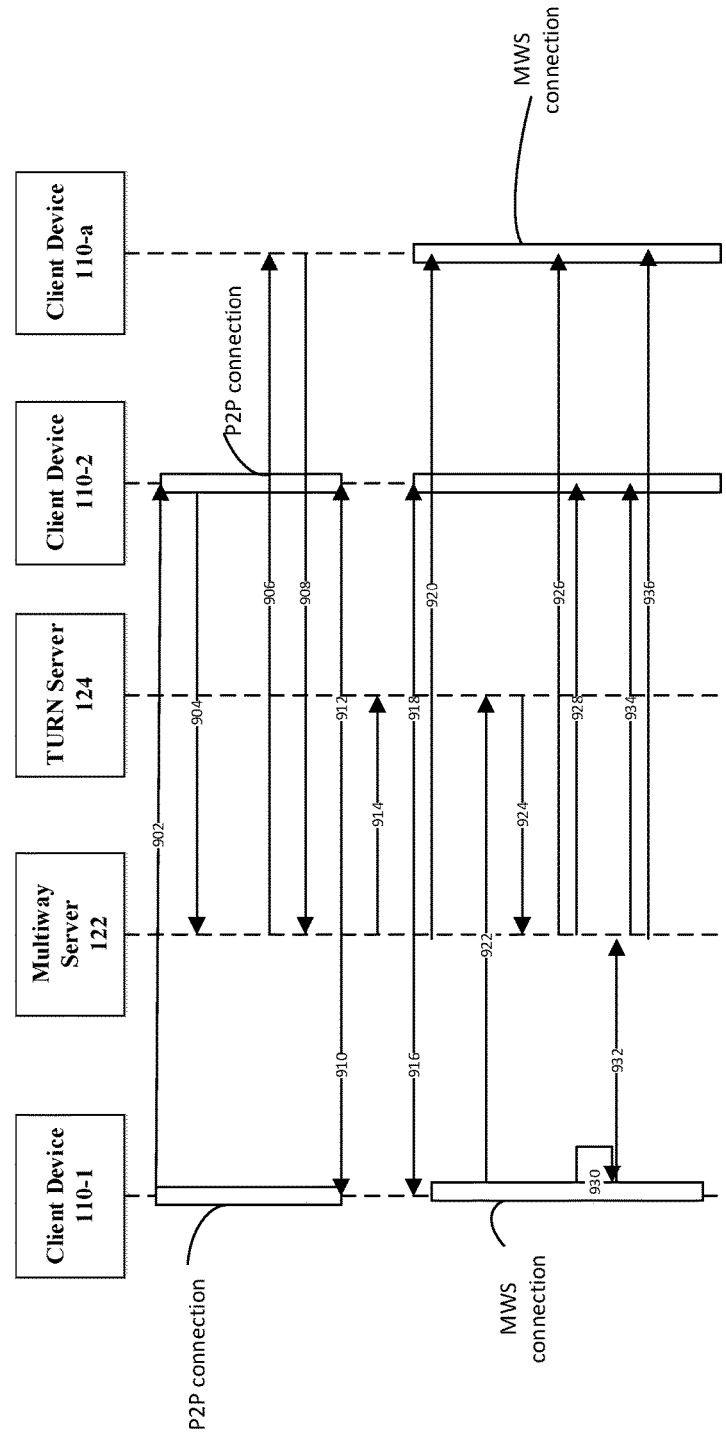
FIG. 9 illustrates an embodiment of a third message flow for the system of FIG. 1.

FIG. 9 illustrates an embodiment of a third message flow for the system of FIG. 1. In particular, the message flow 900 may occur among a plurality of client devices: 110-1, 110-2, and 110-α, the multiway server 122, and the TURN server 124. Message flow 900 may represent messages communicated when a participant is added to a P2P call in progress.

The message flow 900 may begin with the establishment of a P2P call between client device 110-1 and client device 110-2, represented by the message 902. The message 902 may represent some or all of the messages communicated between client device 110-1 and client device 110-2, and the MWS 122, for example, as shown in messages 702, 704, 706, 708, 710 and 712 of the message flow 700.

The message flow 900 continues, while the P2P call is active, when one of the client devices, e.g. client device 110-2, sends a call invitation to the MWS 122 to add a third client device 110-α to the call, in message 904. The message 904 may include an identifier of a third client device, e.g. of client device 110-α, that the operator of client device 110-2 wishes to add to the call. The identifier may be a phone number, a user name, an account name, or any other identifier that allows the MWS 122 to contact the client device 110-α to join the call. The message 904 may also include information such as, but not limited to, a group identifier to be used to identify the group of participants to the call, a user identifier of the operator of client device 110-2, and/or a device identifier of client device 110-2.

The message flow 900 continues when the MWS 122 sends a call invitation to the client device 110-α in message 906, which may be similar to message 704. The call invitation may include various parameters, for example, a group identifier, an identifier of one or more of the other client devices participating in the call, or an identifier of one or more of the other operators of the other client devices participating in the call.

The message flow 900 continues when the client device 110-α sends a ring response to the MWS 122 in message 908. The ring response may include connection status information such as "ringing," "connecting," and/or "connected". In some embodiments, multiple ring responses may be sent as the second device changes connection status.

The message flow 900 continues, once the client device 110-α is connected, when the MWS 122 signals to the client devices 110-1 and 110-2 to switch from P2P mode to a relay mode, in messages 910 and 912, respectively.

The MWS 122 may also allocate a port on the TURN server 124, using message 914. The message 914 may be sent before, concurrently with, or after the messages 910 and 912.

The message flow 900 continues when the MWS 122 provides the addresses of the allocated port(s) to the client devices 110-1, 110-2, and 110-α, in messages 916, 918, and 920, respectively.

Once all of the participating client devices have a port at a TURN server, the call may continue in a relay mode. For example, the message flow 900 continues when one of the client devices, e.g. client device 110-1, sends call data to the TURN server 124 in message 922. The TURN server 124 may forward the call data to the MWS 122 in message 924.

The message flow 900 continues when the MWS 122 forwards, pushes, or otherwise sends the call data to the other devices on the call: client device 110-2 and client device 110-α, in messages 926 and 928, respectively.

The message flow 900 continues when one of the devices, e.g. client device 110-1 changes a communication mode, for example, by activating a video mode, in message 930. The client device 110-1 may then send a media status to the MWS 122 in message 932. The message 932 may indicate, for example, what communication mode changed, and whether the change was to enable or disable the communication mode.

The message flow 900 continues when the MWS 122 pushes the media status to the other devices on the call: client device 110-2 and client device 110-α, in messages 934 and 936, respectively.

Figure 10:
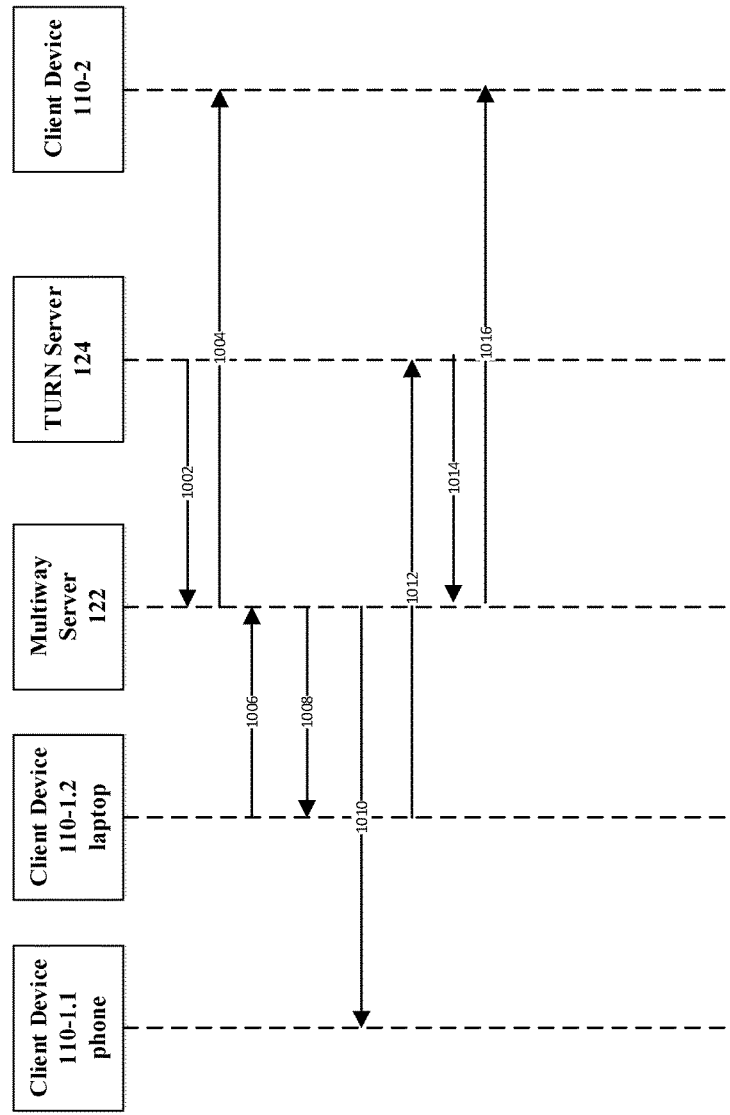
FIG. 10 illustrates a diagram of a fourth message flow for the system of FIG. 1.

FIG. 10 illustrates a diagram of a fourth message flow for the system of FIG. 1. In particular, the message flow 1000 may occur among two client devices, 110-2 and either 110-1.1 or 110-1.2, the multiway server 122, and the TURN server 124. Message flow 1000 may represent messages communicated when a call is switched from one client device 110-1.1 to a different client device 110-1.2 for the same user while in a relay mode. As shown in FIG. 10, a relay call between client device 110-1.1 and client device 110-2 is already established.

The message flow 1000 begins with an exchange of call data where the TURN server 124 has received call data from client device 110-1.1 (not shown) and transmits the call data to the MWS 122 in message 1002. The MWS 122 transmits the call data to the client device 110-2 in message 1004.

The message flow 1000 continues when a third device, client device 110-1.2, sends a join request to the MWS 122 in message 1006. The client device 110-1.2 may be, for example, a laptop or desktop computer, where client device 110-1.1 may be a mobile device such as a smart phone. Both client devices 110-1.1 and 110-1.2 may be operated by the same user and may be associated with the same user identifier by the MWS system 120.

The message flow 1000 continues when the MWS 122 accepts the join request and connects the client device 110-1.2 to the ongoing call, in message 1008. The message 1008 may represent a plurality of messages exchanged in the connection process.

The message flow 1000 continues when the MWS 122 sends a drop request to the client device 110-1.1 in message 1010. The message 1010 may be a command that causes the client device 110-1.1 to disconnect itself from the call, or may represent that the MWS 122 has disconnected the device. At this point, the user of the client devices 110-1.1 and 110-1.2 is still connected to the call, but through the client device 110-1.2.

The message flow 1000 continues when additional call data is exchanged, for example, from the client device 110-1.2 to the client device 110-2 via the TURN server 124 and the MWS 122 using messages 1012, 1014 and 1016.

Although the message flow 1000 is depicted as taking place between two user participants, any number of user participants may be taking part in the call, and the message flow 1000 may occur when any of the participants switches to using a different client device.

Figure 11:
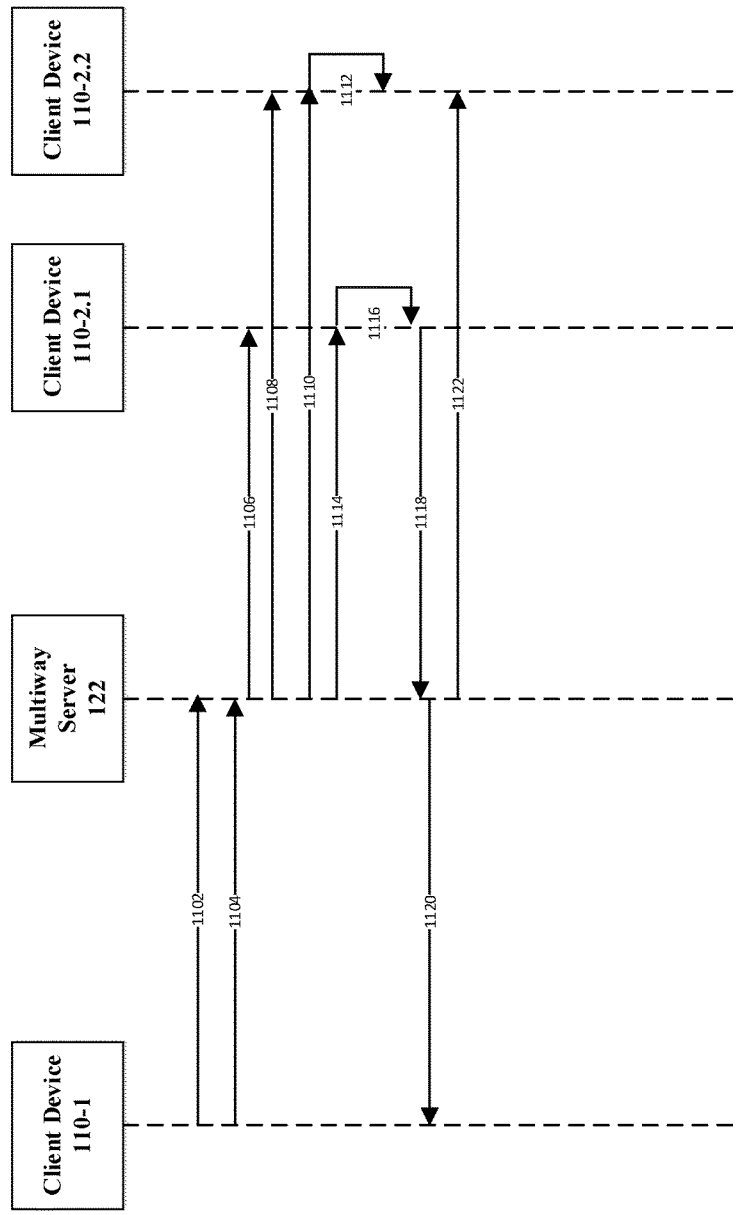
FIG. 11 illustrates a diagram of a fifth message flow for the system of FIG. 1.

FIG. 11 illustrates a diagram of a fifth message flow for the system of FIG. 1. In particular, the message flow 1100 may occur among two client devices, 110-1 and 110-2, the multiway server 122 and a TURN server 124. Message flow 1100 may represent messages communicated when a call is initiated by client device 110-1 to a user having multiple client devices, e.g. client device 110-2.1 and client device 110-2.2, and a video preview is provided.

The message flow 1100 begins when the client device 110-1 sends a join request to the MWS 122 in message 1102. The join request may include one or more parameters. For example, the join request may include an identifier of a second user, e.g. of client devices 110-2.1 and 110-2.2, that the operator of the first client device wishes to call. The identifier may be a phone number, a user name, an account name, or any other identifier that allows the MWS 122 to contact the client devices 110-2.1 and 110-2.2 to join the call. The join request may specify the user without specifying which particular devices to call.

The message flow 1100 continues when the client device 110-1 sends call data in the form of video data to the MWS 122 in message 1104.

The message flow 1100 continues when the MWS 122 sends a call invitation to both the client devices 110-2.1 and 110-2.2 in messages 1106 and 1108, respectively. The call invitation may include various parameters, for example, a group identifier, an identifier of the calling client device, or an identifier of the operator of the calling client device.

The message flow 1100 continues when the MWS 122 sends the video call data to the called devices before either of the devices has "answered" the call, e.g. while the devices are still "ringing", in messages 1110 and 1114.

The message flow 1100 continues when each called client device 110-2.1 and 110-2.2 presents the received video call data on a display in messages 1116 and 1112, respectively. This may provide, to the called user, information beyond just who is calling, for example, by showing an environment around the caller, facial expressions on the caller, other people near the caller and so forth.

The message flow 1100 continues when one of the called devices, e.g. client device 110-2.1, answers the call in message 1118.

The message flow 1100 continues when the MWS 122 informs the calling client device 110-1 that the client device 110-2.1 is connected, in message 1120. The MWS 122 may also send a drop request to the client device 110-2.2 in message 1122. The message 1122 may represent a call cancellation command, or otherwise indicate that the MWS 122 has disconnected the device.

The message flows depicted here represent various operations that may take place during a multi-modal multi-party call. Some or all of the messages in any of the message flows may take place during a single call, while other messages may not take place at all during a particular call.

Figure 12:
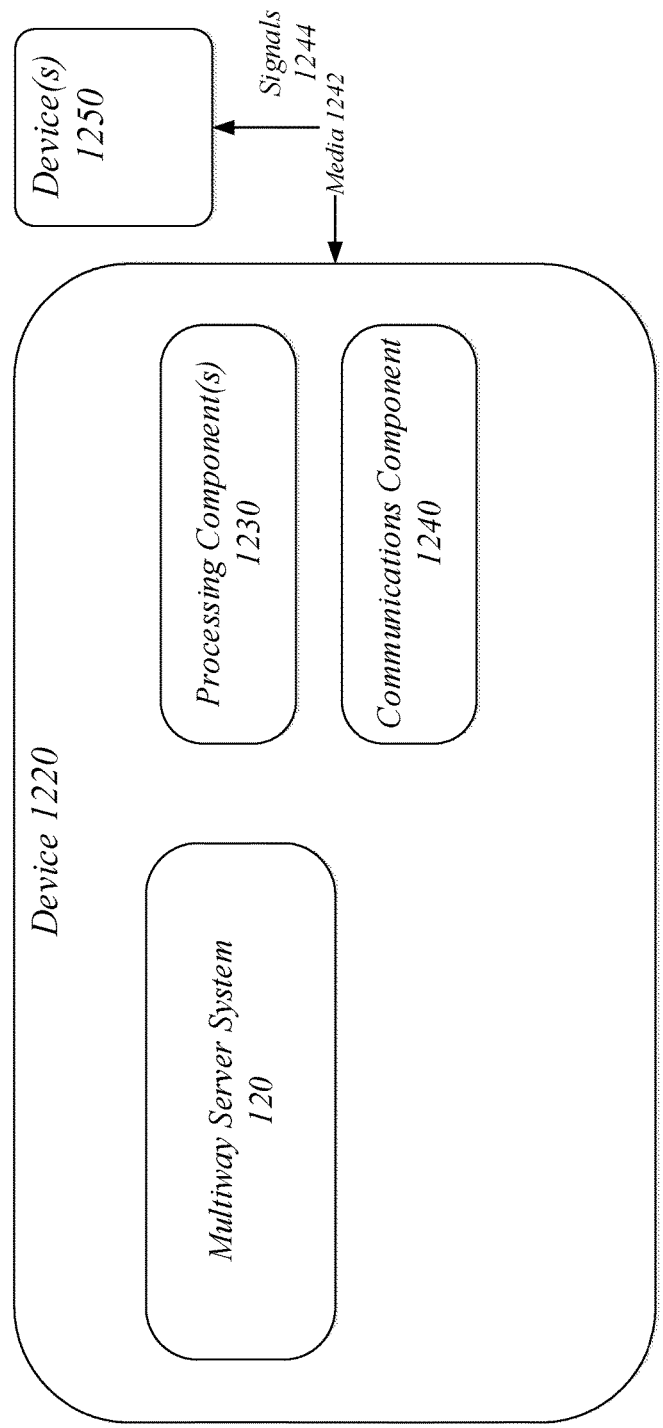
FIG. 12 illustrates a diagram of a centralized system for the system of FIG. 1.

FIG. 12 illustrates a centralized system 1200. The centralized system 1200 may implement some or all of the structure and/or operations for the system 100 for securing delivery of an animated message in a single computing entity, such as entirely within a single device 1220.

The device 1220 may comprise any electronic device capable of receiving, processing, and sending information, and may be an embodiment of a computing device, e.g. a server 122. Examples of an electronic device may include without limitation an ultra-client device, a client device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1220 may execute processing operations or logic for the system 100 using a processing component 1230. The processing component 1230 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1220 may execute communications operations or logic for the system 100 using communications component 1240. The communications component 1240 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1240 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1242 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1220 may communicate with other devices 1250 over a communications media 1242 using communications signals 1244 via the communications component 1240. The devices 1250 may be internal or external to the device 1220 as desired for a given implementation.

The device 1220 may include within it the multiway server system 120. Device 1220 may be operative to carry out the tasks of these elements using processing component 1230 and communications component 1240. Devices 1250 may comprise any of devices 110 or 500, the signals 1244 over media 1242 comprising the interactions between the device 1220 and its elements and these respective devices.

Figure 13:
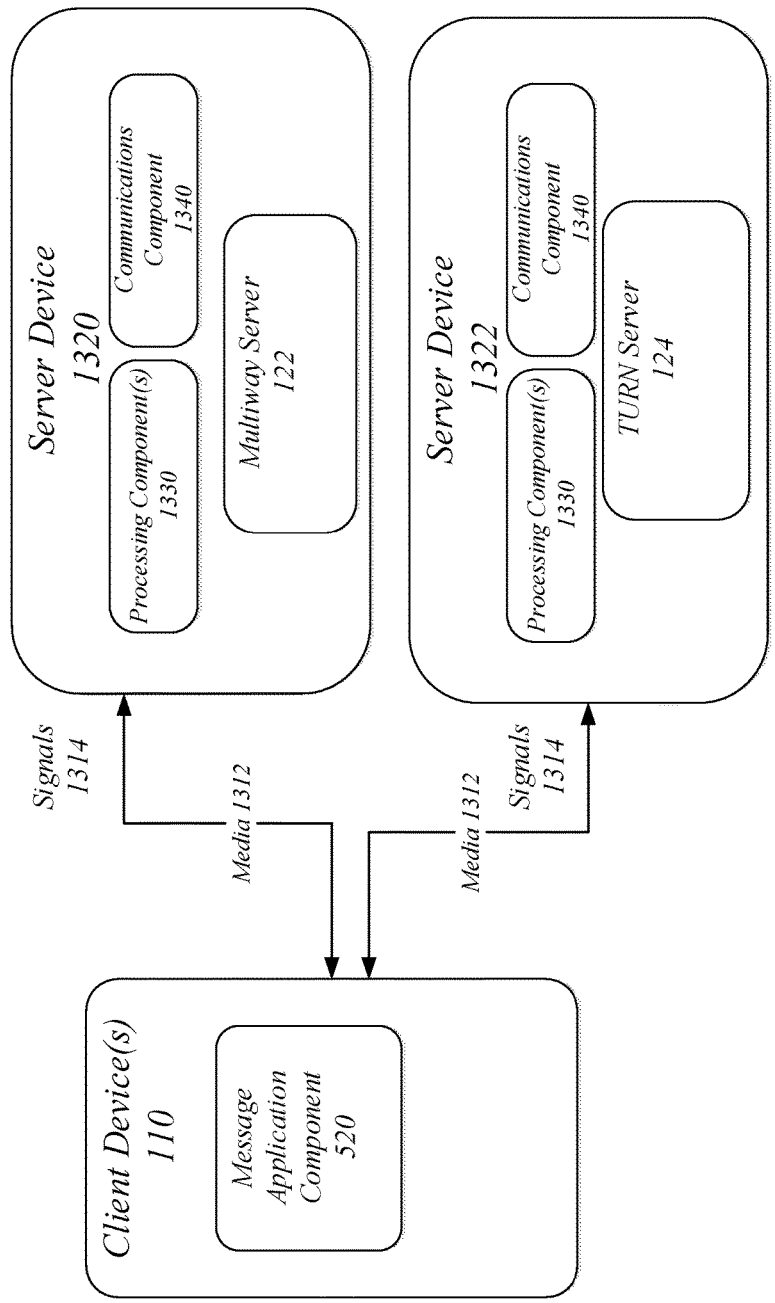
FIG. 13 illustrates a diagram of a distributed system for the system of FIG. 1.

FIG. 13 illustrates an embodiment of a distributed system 1300. The distributed system 1300 may distribute portions of the structure and/or operations for the system 100 across multiple computing entities. Examples of distributed system 1300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1300 may comprise one or more server devices, such as a server device 1320 and server device 1322. In general, the server devices 1320 and 1322 may be similar to the device 1220 as described with reference to FIG. 12. For instance, the server devices 1320 and 1322 may comprise a processing component 1330 and a communications component 1340, which are the same or similar to the processing component 1230 and the communications component 1240, respectively, as described with reference to FIG. 12. In another example, server devices 1320 and 1322 may communicate over a communications media 1312 using their respective communications signals 1314 via the communications components 1340.

The server device 1320 may comprise or employ one or more server programs that operate to perform various methodologies in accordance with the described embodiments. For example, server device 1320 may implement the multiway server 122. The server device 1322 may comprise or employ one or more server programs that operate to perform various methodologies in accordance with the described embodiments. For example, server device 1322 may implement the TURN server 124. It will be appreciated a server device 1320 or 1322—or any of the server devices discussed herein—may itself comprise multiple servers.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 14:
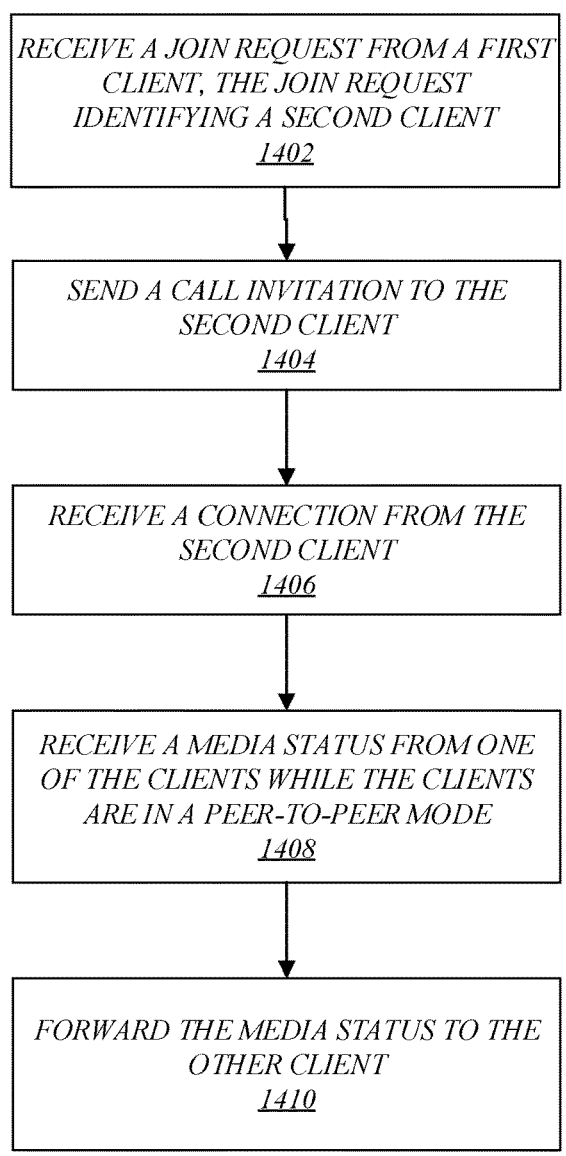
FIG. 14 illustrates an embodiment of a logic flow for the system of FIG. 1.

FIG. 14 illustrates an embodiment of a logic flow 1400 for the system 100. The logic flow 1400 may be representative of some or all of the operations executed by one or more embodiments described herein. The operations of the logic flow 1400 may be performed by the multiway server system 120, for example, by the multiway server 600 to set up a multi-modal call between two clients.

In the illustrated embodiment shown in FIG. 14, the logic flow 1400 may be operative to receive a join request from a first client at block 1402. The join request may identify a second client. The join request may include one or more parameters. For example, the join request may include an identifier of a second client device, e.g. of client device 110-2, that the operator of the first client device wishes to call. The identifier may be a phone number, a user name, an account name, or any other identifier that allows the MWS system 120 to contact the client device 110-2 to join the call. The join request may also include information such as, but not limited to, a group identifier to be used to identify the group of participants to the call, a user identifier of the operator of the first client device, and/or a device identifier of the first client device.

The logic flow 1400 may be operative to send a call invitation to the second client at block 1404. The call invitation may include various parameters, for example, a group identifier provided by the first client, an identifier of the first client device, or an identifier of the operator of the first client device.

The logic flow 1400 may be operative to receive a connection from the second client at block 1406. For example, when the second client answers the call, the second client may be connected to the MSW 122 and may be a part of the call and of any group that may be associated with the call. In an embodiment, the two client devices may then negotiate and setup a P2P call directly. In another embodiment, the two client devices may negotiate and setup a P2P call via the MWS 122 (not shown).

The logic flow 1400 may be operative to receive a media status from one of the clients, while the clients are communicating in a peer to peer mode, at block 1408. For example, one of the operators may have enabled a "data mode" on their client device in order to send special effects overlays to a video call. The media status from that device may indicated that "data mode" has changed from a previous state, and may indicate explicitly that "data mode" is on or enabled.

The logic flow 1400 may be operative to forward the media status to the other client, at block 1410. For example, the status manager 620 may push the media status message to each of the other participant client devices, but not to the sending client.

Figure 15:
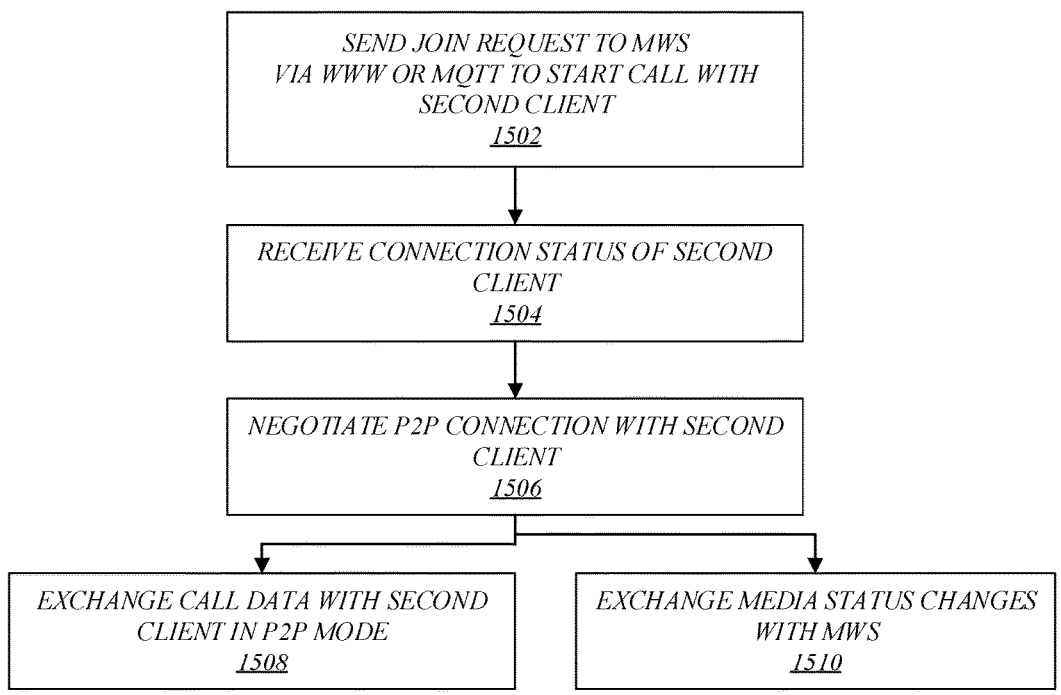
FIG. 15 illustrates an embodiment of a second logic flow for the system of FIG. 1.

FIG. 15 illustrates an embodiment of a logic flow 1500 for the system 100. The logic flow 1500 may be representative of some or all of the operations executed by one or more embodiments described herein. The operations of the logic flow 1500 may be performed by a client device 110 to initiate a call with another client.

In the illustrated embodiment shown in FIG. 15, the logic flow 1500 may begin at block 1502. In block 1502, the logic flow 1500 may be operative to send a join request to the multiway server (MWS) to start a call with a second client. For example, the message application component 520 may send the join request via the communications component 530 to the MWS 122. The join request may be sent via message queueing telemetry transport (MQTT) or the world wide web (WWW).

The logic flow 1500 may be operative to receive a connection status of the second client, at block 1504. For example, the message application component 520 may receive, from the MWS 122, one or more connection statuses such as "ringing", "connecting", "connected" and/or "declined". In some embodiments the message application component 520 may present the connection status to the user via the display component 508.

The logic flow 1500 may be operative to negotiate a peer to peer connection with the second client, at block 1506. For example, once the second client has answered the call and is connected, the message application component 520 and the communications component 530 may send a P2P setup message to the MWS 122 and/or to the second client directly. The P2P setup message may request a P2P connection and may provide one or more parameters of the client device and/or other information that may be needed to make a P2P connection.

The logic flow 1500 may be operative to exchange call data with the other client participating in the call in a peer to peer mode, at block 1508. For example, the message application component 520 may receive, from the operator, communication input in any of a variety of forms, such as text, video, audio, special effect selections and so forth. The message application component 520 may format the communication input for transmission over the P2P connection, e.g. into packets of call data. The call data may be transmitted by the communication component 530 directly to the other client device over the P2P connection.

The logic flow 1500 may be operative to exchange media status changes with the MWS at block 1510. For example, if the operator of the client device turns on the camera or otherwise enables a video mode of communication, the message application component 520 may send a media status to the MWS 122 that indicates that video mode is now on. The exchanges in blocks 1508 and 1510 may occur in parallel.

Figure 16:
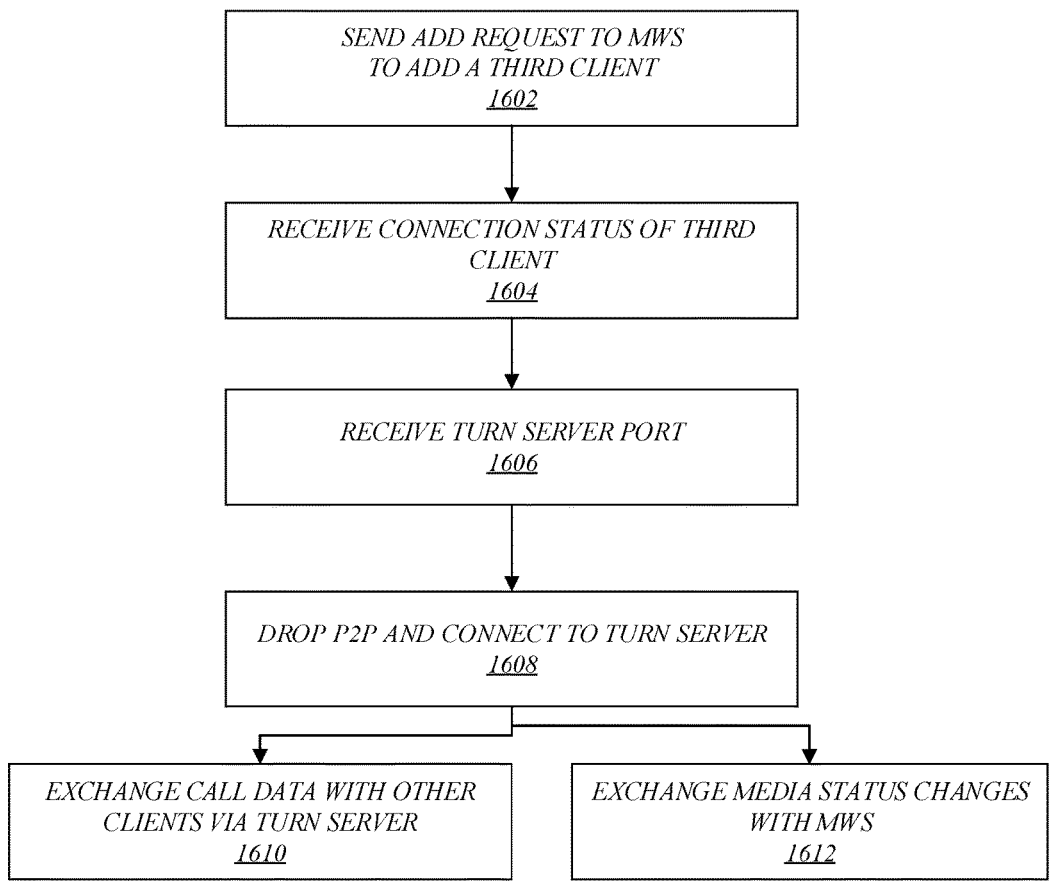
FIG. 16 illustrates an embodiment of a third logic flow for the system of FIG. 1.

FIG. 16 illustrates an embodiment of a logic flow 1600 for the system 100. The logic flow 1600 may be representative of some or all of the operations executed by one or more embodiments described herein. The operations of the logic flow 1600 may be performed by a client device 110 to add a third participant to a call in progress. The call may b in a P2P mode with a second client.

In the illustrated embodiment shown in FIG. 16, the logic flow 1600 may begin at block 1602. The logic flow 1600 may be operative at block 1602 to send a request to a multiway server (MWS) to add a third client to a P2P call in progress. For example, the message application component 520 may send a request to the MWS 122 that includes an identifier of a third user or a device of the third user.

The logic flow 1600 may be operative to receive a connection status of the third client, at block 1604. For example, the message application component 520 may receive, from the MWS 122, one or more connection statuses such as "ringing", "connecting", "connected" and/or "declined". In some embodiments the message application component 520 may present the connection status to the user via the display component 508.

The logic flow 1600 may be operative to receive a TURN server port at block 1606. For example, the MWS 122 may have allocated a port on a TURN server for the client device and may provide the port address to the client.

The logic flow 1600 may be operative to drop the P2P call and connect to the TURN server at block 1608. For example, the message application component 520 may, via the communications component 530, connect to the port at the provided address, and may disconnect from the P2P connection with the second client device.

The logic flow 1600 may be operative to exchange call data with one or more of the other clients participating in the call at block 1610. For example, the message application component 520 may send and/or receive call data to and from the other devices in the call via the TURN server.

The logic flow 1600 may be operative to exchange media status changes with the MWS at block 1612. For example, if the operator of the client device turns off a camera or otherwise disables a video mode of communication, the message application component 520 may send a media status to the MWS 122 that indicates that video mode is now off. The exchanges in blocks 1610 and 1612 may occur in parallel.

Figure 17:
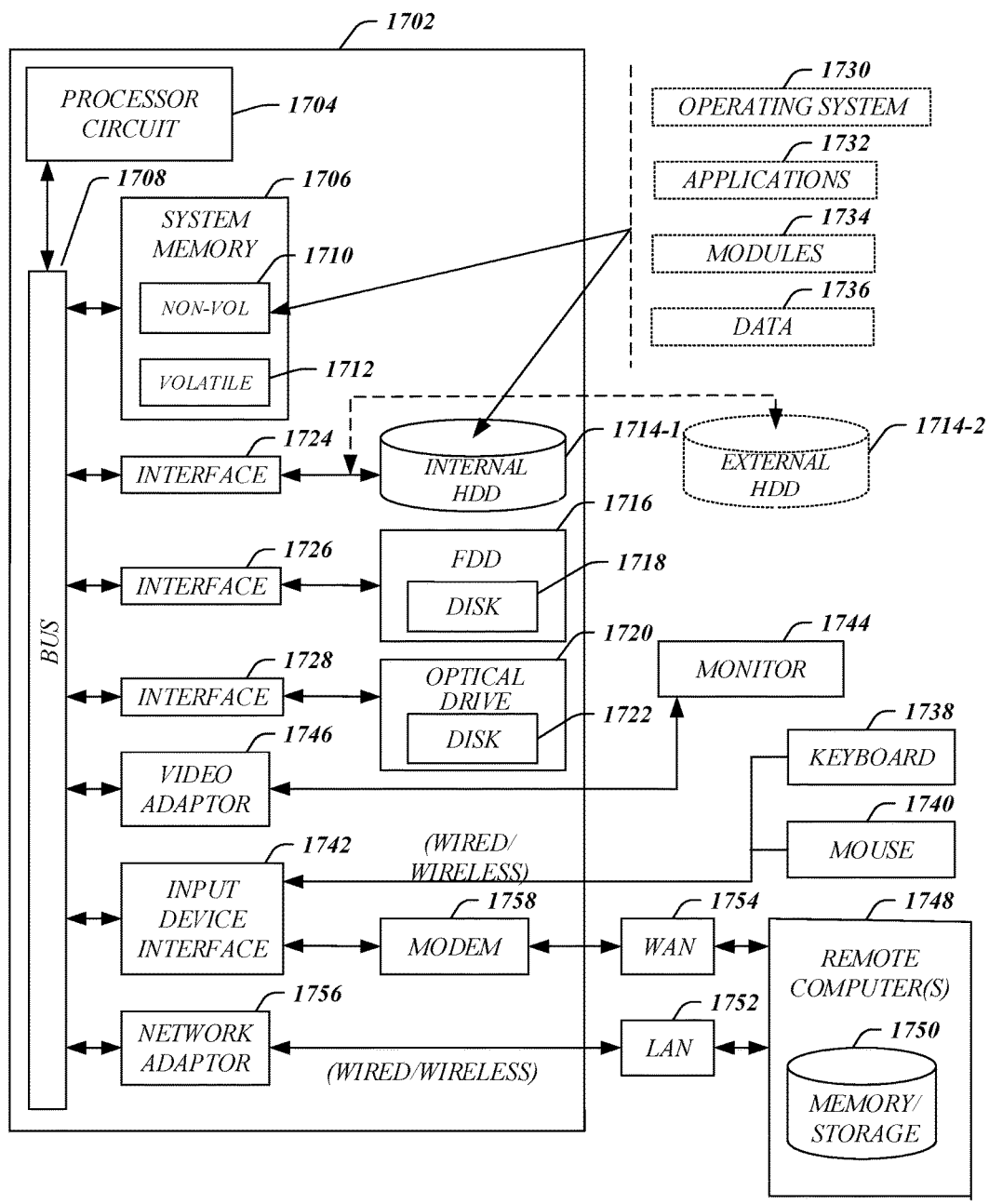
FIG. 17 illustrates an embodiment of a computing architecture.

FIG. 17 illustrates an embodiment of an exemplary computing architecture 1700 suitable for implementing various embodiments as previously described. In one embodiment, the computing architecture 1700 may comprise or be implemented as part of an electronic device. Examples of an electronic device may include those described with reference to FIGS. 12-13, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1700.

As shown in FIG. 17, the computing architecture 1700 comprises a processing circuit 1704, a system memory 1706 and a system bus 1708. The processing circuit 1704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing circuit 1704.

The system bus 1708 provides an interface for system components including, but not limited to, the system memory 1706 to the processing circuit 1704. The system bus 1708 can be any of several types of bus structure that may further interconnect to a memory bus (with or without a memory controller), a peripheral bus, and a local bus using any of a variety of commercially available bus architectures. Interface adapters may connect to the system bus 1708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 17, the system memory 1706 can include non-volatile memory 1710 and/or volatile memory 1712. A basic input/output system (BIOS) can be stored in the non-volatile memory 1710.

The computer 1702 may include various types of computer-readable storage media in the form of one or more lower speed memory units, including an internal (or external) hard disk drive (HDD) 1714-1 and 1714-2, respectively, a magnetic floppy disk drive (FDD) 1716 to read from or write to a removable magnetic disk 1718, and an optical disk drive 1720 to read from or write to a removable optical disk 1722 (e.g., a CD-ROM or DVD). The HDD 1714, FDD 1716 and optical disk drive 1720 can be connected to the system bus 1708 by a HDD interface 1724, an FDD interface 1726 and an optical drive interface 1728, respectively. The HDD interface 1724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1710, 1712, including an operating system 1730, one or more application programs 1732, other program modules 1734, and program data 1736. In one embodiment, the one or more application programs 1732, other program modules 1734, and program data 1736 can include, for example, the various applications and/or components of the message application component 520; and the multiway server 600.

An operator can enter commands and information into the computer 1702 through one or more wire/wireless input devices, for example, a keyboard 1738 and a pointing device, such as a mouse 1740. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, trackpads, sensors, styluses, and the like. These and other input devices are often connected to the processing circuit 1704 through an input device interface 1742 that is coupled to the system bus 1708, but can be connected by other interfaces such as a parallel port, IEEE 1394 serial port, a game port, a USB port, an IR interface, and so forth.

A monitor 1744 or other type of display device is also connected to the system bus 1708 via an interface, such as a video adaptor 1746. The monitor 1744 may be internal or external to the computer 1702. In addition to the monitor 1744, a computer typically includes other peripheral output devices, such as speakers, printers, and so forth.

The computer 1702 may operate in a networked environment using logical connections via wired and/or wireless communications to one or more remote computers, such as a remote computer 1748. The remote computer 1748 can be a workstation, a server computer, a router, a personal computer, a portable computer, a microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, for example, a wide area network (WAN) 1754. Such LAN and WAN networking environments are commonplace in offices and companies, and facilitate enterprise-wide computer networks, such as intranets, all of which may connect to a global communications network, for example, the Internet.

When used in a LAN networking environment, the computer 1702 is connected to the LAN 1752 through a wired and/or wireless communication network interface or adaptor 1756. The adaptor 1756 can facilitate wired and/or wireless communications to the LAN 1752, which may also include a wireless access point disposed thereon for communicating with the wireless functionality of the adaptor 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wired and/or wireless device, connects to the system bus 1708 via the input device interface 1742. In a networked environment, program modules depicted relative to the computer 1702, or portions thereof, can be stored in the remote memory/storage device 1750. It will be appreciated that the network connections shown are exemplary and other means of establishing a communications link between the computers can be used.

The computer 1702 is operable to communicate with wire and wireless devices or entities using the IEEE 802 family of standards, such as wireless devices operatively disposed in wireless communication (e.g., IEEE 802.21 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.21x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 18:
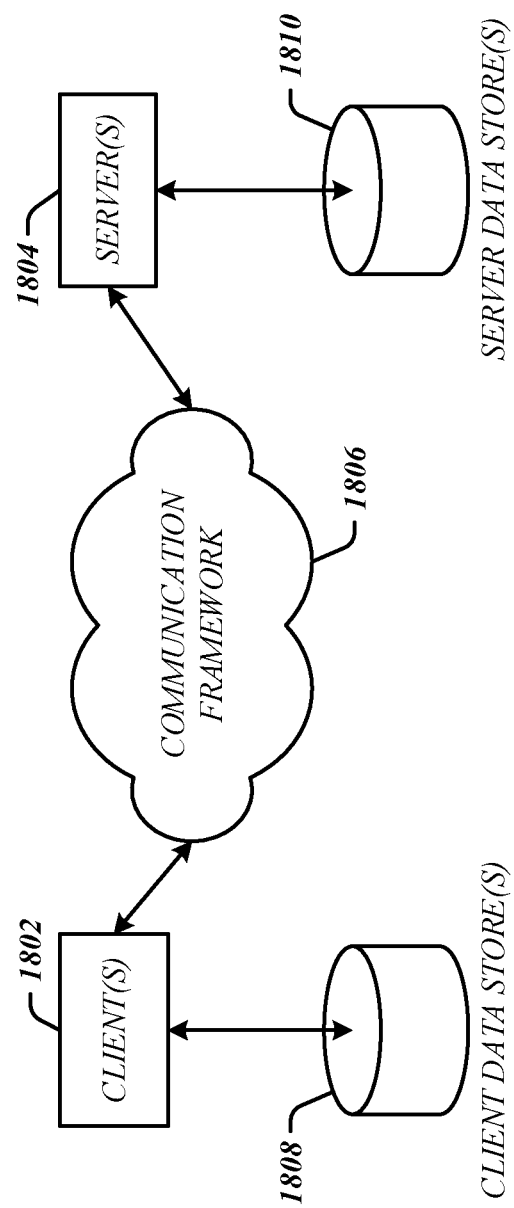
FIG. 18 illustrates an embodiment of a communications architecture.

FIG. 18 illustrates a block diagram of an exemplary architecture 1800 suitable for implementing various embodiments as previously described. The communications architecture 1800 includes various common communications elements, such as a transmitter, receiver, transceiver, radio, network interface, baseband processor, antenna, amplifiers, filters, power supplies, and so forth. The embodiments, however, are not limited to this implementation by the communications architecture 1800.

As shown in FIG. 18, the communications architecture 1800 comprises one or more clients 1802 and servers 1804. The clients 1802 may implement the devices 1220. The servers 1804 may implement the server devices 1320, 1322. The clients 1802 and the servers 1804 are operatively connected to one or more respective client data stores 1808 and server data stores 1810 that can be employed to store information local to the respective clients 1802 and servers 1804, such as cookies and/or associated contextual information.

The clients 1802 and the servers 1804 may communicate information among each other using a communication framework 1806. The communications framework 1806 may implement any well-known communications techniques and protocols. The communications framework 1806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1802 and the servers 1804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 19:
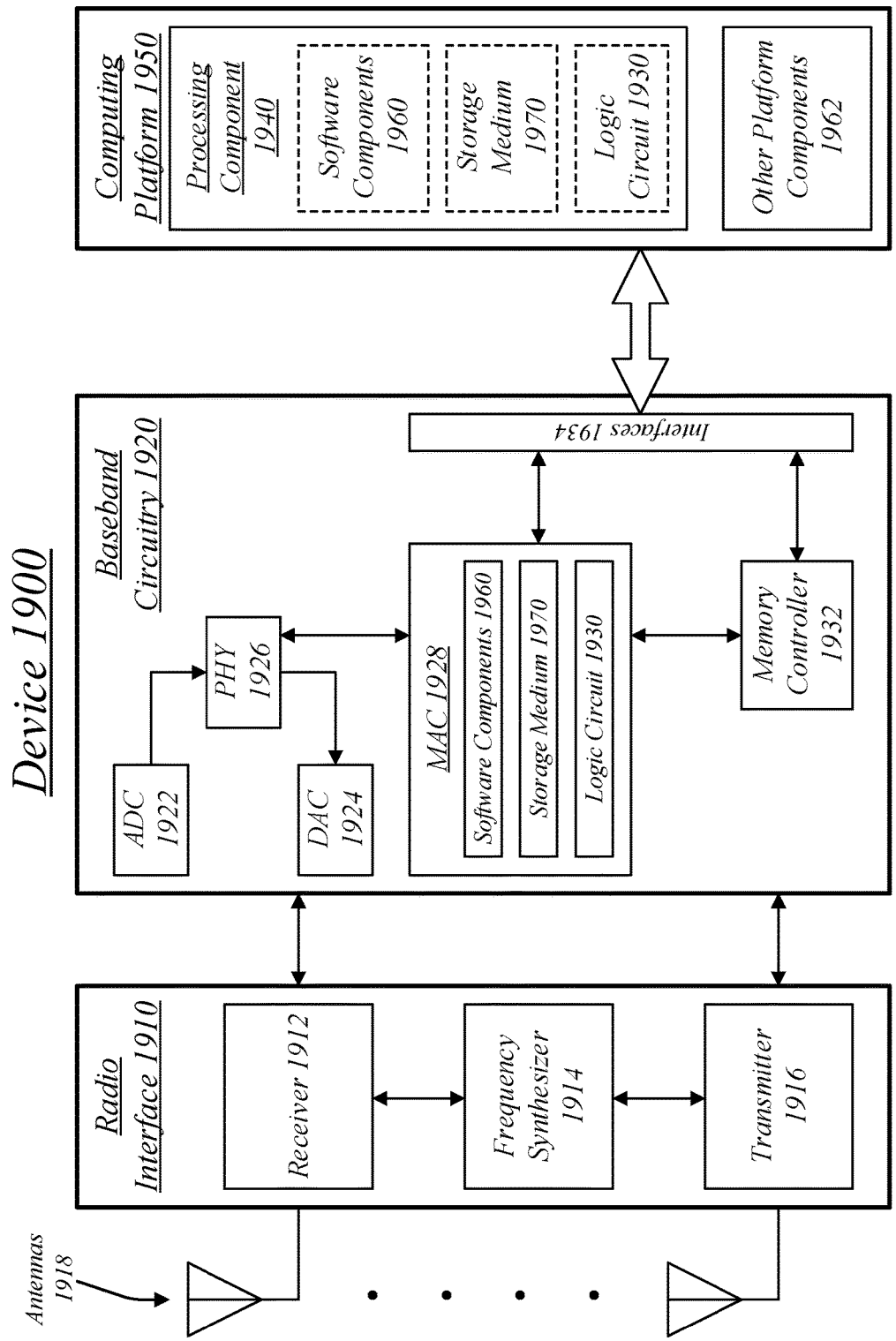
FIG. 19 illustrates an embodiment of a device for use in a multicarrier OFDM system.

FIG. 19 illustrates an embodiment of a device 1900 for use in a multicarrier OFDM system, such as the multiway communication system 100. Device 1900 may implement, for example, software components 1960 as described with reference to client device 110, 500 and/or a logic circuit 1930. The logic circuit 1930 may include physical circuits to perform operations described for the client device 110, 500. As shown in FIG. 19, device 1900 may include a radio interface 1910, baseband circuitry 1920, and computing platform 1950, although embodiments are not limited to this configuration.

The device 1900 may implement some or all of the structure and/or operations for the client device 110, 500 and/or logic circuit 1930 in a single computing entity, such as entirely within a single device. Alternatively, the device 1900 may distribute portions of the structure and/or operations for the client device 110, 500 and/or logic circuit 1930 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1910 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1910 may include, for example, a receiver 1912, a transmitter 1916 and/or a frequency synthesizer 1914. Radio interface 1910 may include bias controls, a crystal oscillator and/or one or more antennas 1918. In another embodiment, radio interface 1910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1920 may communicate with radio interface 1910 to process, receive and/or transmit signals and may include, for example, an analog-to-digital converter 1922 for down converting received signals, a digital-to-analog converter 1924 for up converting signals for transmission. Further, baseband circuitry 1920 may include a baseband or physical layer (PHY) processing circuit 1926 for PHY link layer processing of respective receive/transmit signals. Baseband circuitry 1920 may include, for example, a processing circuit 1928 for medium access control (MAC)/data link layer processing. Baseband circuitry 1920 may include a memory controller 1932 for communicating with processing circuit 1928 and/or a computing platform 1950, for example, via one or more interfaces 1934.

In some embodiments, PHY processing circuit 1926 may include a frame construction and/or detection module, in combination with additional circuitry such as a buffer memory, to construct and/or deconstruct communication frames, such as radio frames. Alternatively or in addition, MAC processing circuit 1928 may share processing for certain of these functions or perform these processes independent of PHY processing circuit 1926. In some embodiments, MAC and PHY processing may be integrated into a single circuit.

The computing platform 1950 may provide computing functionality for the device 1900. As shown, the computing platform 1950 may include a processing component 1940. In addition to, or alternatively, the baseband circuitry 1920, the device 1900 may execute processing operations or logic for the client device 110, 500 and logic circuit 1930 using the processing component 1940. The processing component 1940 (and/or PHY 1926 and/or MAC 1928) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1950 may further include other platform components 1962. Other platform components 1962 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth.

The computing platform 1950 and the baseband circuitry 1920 may further include one or memory units in the form of storage medium 1970. Examples of memory units may include, without limitation. various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1900 may be, for example, an ultra-client device, a client device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1900 described herein, may be included or omitted in various embodiments of device 1900, as suitably desired. In some embodiments, device 1900 may be configured to be compatible with protocols and frequencies associated one or more of the 3GPP LTE Specifications and/or IEEE 802.16 standards for WMANs, and/or other broadband wireless networks, cited herein, although the embodiments are not limited in this respect.

Embodiments of device 1900 may be implemented using single input single output (SISO) architectures. However, certain implementations may include multiple antennas (e.g., antennas 1918) for transmission and/or reception using adaptive antenna techniques for beamforming or spatial division multiple access (SDMA) and/or using MIMO communication techniques.

The components and features of device 1900 may be implemented using any combination of discrete circuitry, application specific integrated circuits (ASICs), logic gates and/or single chip architectures. Further, the features of device 1900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1900 shown in the block diagram of FIG. 19 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Accordingly, embodiments include methods, apparatuses, and computer-readable storage media for communicating using audio messages. For example, a method may include receiving a join request at a multiway server (MWS) from a first client, the join request identifying a second client; sending a call invitation to the second client from the MWS; receiving a connection from the second client to the MWS; receiving a first media status from one of the first client or the second client while the first client and the second client are in a peer-to-peer mode; and forwarding the first media status to the other of the first client or the second client.

The method may further include allocating a port on a traversal using relays around network address translators (TURN) server; and providing an address of the port to the first client and the second client.

The method may further include receiving an add participant request from one of the first client or the second client, the add participant request identifying a third client; sending a call invitation to the third client from the MWS, the call invitation comprising the address of the port on the TURN server; receiving a connection from the third client to the MWS; receiving a second media status from one of the first, second, or third clients while the first, second, and third clients are in a relay mode with the TURN server; and forwarding the second media status to the others of the first, second, or third clients.

In some embodiments, the media status comprises an indication that a client has activated or deactivated one of: a video mode, a data mode, or an audio mode.

The method may further include receiving a peer to peer (P2P) ping message from one of the first client or the second client while the first client and the second client are in a peer-to-peer mode; and forwarding the P2P ping message to the other of the first client or the second client.

The method may further include notifying the first client and the second client when a P2P ping message is not received; allocating a port on a traversal using relays around network address translators (TURN) sever communicatively coupled to the MWS; and providing an address of the port to the first client and the second client.

The method may further include receiving a second join request from a third client, wherein the third client is associated with a same user associated with the first client or the second client; accepting the join request from the third client; and disconnecting the other client associated with the same user.

The method may further include receiving video data from the first client; and forwarding the video data to the second client before receiving a connection from the second client.

An apparatus may include a processor circuit; a call manager component for execution on the processor circuit to: receive a join request from a first client, the join request identifying a second client; send a call invitation to the second client; and receive a connection from the second client; and a status manager component for execution on the processor circuit to: receive a first media status from one of the first client or the second client while the first client and the second client are in a peer-to-peer mode; and forward the first media status to the other of the first client or the second client.

The apparatus may further comprise a traversal using relays around network address translators (TURN) manager component for execution on the processor circuit to: allocate a port on a TURN server communicatively coupled to the apparatus; and provide an address of the port to the first client and the second client.

The call manager component of the apparatus may further receive an add participant request from one of the first client or the second client, the add participant request identifying a third client, send a call invitation to the third client from the MWS, the call invitation comprising the address of the port on the TURN server, and receive a connection from the third client. The status manager component may further receive a second media status from one of the first, second, or third clients while the first, second, and third clients are in a relay mode with the TURN server, and forward the second media status to the others of the first, second, or third clients.

The TURN manager component of the apparatus may further allocate a first port on a first TURN server for the first client, and allocate a second port on a second TURN server for the second client.

The call manager component of the apparatus may further receive a peer to peer (P2P) ping message from one of the first client or the second client while the first client and the second client are in a peer-to-peer mode, and to forward the P2P ping message to the other of the first client or the second client.

The call manager component of the apparatus may further notify the first client and the second client when a P2P ping message is not received; and the apparatus further comprising a traversal using relays around network address translators (TURN) manager component for execution on the processor circuit to allocate a port on a TURN server, and provide an address of the port to the first client and the second client.

The call manager component of the apparatus may further receive a second join request from a third client, wherein the third client is associated with a same user associated with the first client or the second client, accept the join request from the third client, and disconnect the other client associated with the same user.

The call manager component of the apparatus may further receive video data from the first client, and forward the video data to the second client before receiving a connection from the second client.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a join request at a multiway server (MWS) from a first client, the join request identifying a second client;
sending a call invitation to the second client from the MWS;
receiving a connection from the second client to the MWS;
receiving a first media status at the MWS from one of the first client or the second client while the first client and the second client are in a peer-to-peer mode;
forwarding the first media status to the other of the first client or the second client;
allocating a port on a traversal using relays around network address translators (TURN) server;
providing an address of the port to the first client and the second client;
receiving an add participant request from one of the first client or the second client, the add participant request identifying a third client;
sending a call invitation to the third client from the MWS, the call invitation comprising the address of the port on the TURN server;
receiving a connection from the third client to the MWS;
receiving a second media status from one of the first, second, or third clients while the first, second, and third clients are in a relay mode with the TURN server; and
forwarding the second media status to the others of the first, second, or third clients.

2. The method of claim 1, comprising:
receiving a peer to peer (P2P) ping message from one of the first client or the second client while the first client and the second client are in a peer-to-peer mode; and
forwarding the P2P ping message to the other of the first client or the second client.

3. The method of claim 2, comprising:
notifying the first client and the second client when a P2P ping message is not received;
allocating a port on a traversal using relays around network address translators (TURN) sever communicatively coupled to the MWS; and
providing an address of the port to the first client and the second client.

4. The method of claim 1, comprising:
receiving a second join request from a third client, wherein the third client is associated with a same user associated with the first client or the second client;
accepting the join request from the third client; and
disconnecting the other client associated with the same user.

5. The method of claim 1, comprising:
receiving video data from the first client; and
forwarding the video data to the second client before receiving a connection from the second client.

6. An apparatus, comprising:
a processor circuit;
a call manager component for execution on the processor circuit to:
receive a join request from a first client, the join request identifying a second client;
send a call invitation to the second client; and
receive a connection from the second client;
a status manager component for execution on the processor circuit to:
receive a first media status at the MWS from one of the first client or the second client while the first client and the second client are in a peer-to-peer mode; and
forward the first media status to the other of the first client or the second client; and
a traversal using relays around network address translators (TURN) manager component for execution on the processor circuit to:
allocate a port on a TURN server communicatively coupled to the apparatus; and
provide an address of the port to the first client and the second client;
wherein:
the call manager component is further configured to receive an add participant request from one of the first client or the second client, the add participant request identifying a third client, send a call invitation to the third client from the MWS, the call invitation comprising the address of the port on the TURN server, and receive a connection from the third client; and
the status manager component is further configured to receive a second media status from one of the first, second, or third clients while the first, second, and third clients are in a relay mode with the TURN server, and forward the second media status to the others of the first, second, or third clients.

7. The apparatus of claim 6, the TURN manager component further to allocate a first port on a first TURN server for the first client, and allocate a second port on a second TURN server for the second client.

8. The apparatus of claim 6, the call manager component further to receive a peer to peer (P2P) ping message from one of the first client or the second client while the first client and the second client are in a peer-to-peer mode, and to forward the P2P ping message to the other of the first client or the second client.

9. The apparatus of claim 8, the call manager component further to notify the first client and the second client when a P2P ping message is not received; and the apparatus further comprising a traversal using relays around network address translators (TURN) manager component for execution on the processor circuit to allocate a port on a TURN server, and provide an address of the port to the first client and the second client.

10. The apparatus of claim 6, the call manager component further to receive a second join request from a third client, wherein the third client is associated with a same user associated with the first client or the second client, accept the join request from the third client, and disconnect the other client associated with the same user.

11. At least one non-transitory computer-readable storage medium comprising instructions that, when executed, cause a multiway server (MWS) to:
receive a join request at the MWS from a first client, the join request identifying a second client;
send a call invitation to the second client from the MWS;
receive a connection from the second client to the MWS;
receive a first media status at the MWS from one of the first client or the second client while the first client and the second client are in a peer-to-peer mode;
forward the first media status to the other of the first client or the second client;
allocate a port on a traversal using relays around network address translators (TURN) server;
provide an address of the port to the first client and the second client;
receive an add participant request from one of the first client or the second client, the add participant request identifying a third client;
send a call invitation to the third client from the MWS, the call invitation comprising the address of the port on the TURN server;
receive a connection from the third client to the MWS;
receive a second media status from one of the first, second, or third clients while the first, second, and third clients are in a relay mode with the TURN server; and
forward the second media status to the others of the first, second, or third clients.

12. The computer-readable storage medium of claim 11, comprising instructions that when executed, cause the MWS to: receive a peer to peer (P2P) ping message from one of the first client or the second client while the first client and the second client are in the peer-to-peer mode; and forward the P2P ping message to the other of the first client or the second client.

13. The computer-readable storage medium of claim 11, comprising instructions that when executed, cause the MWS to:
receive a second join request from a third client, wherein the third client is associated with a same user associated with the first client or the second client;
accept the join request from the third client; and
disconnect the other client associated with the same user.

14. The computer-readable storage medium of claim 11, wherein the media status comprises an indication that a client has activated or deactivated one of: a video mode, a data mode, or an audio mode.

* * * * *